(12) United States Patent
Mezghani

(10) Patent No.: US 9,196,058 B2
(45) Date of Patent: Nov. 24, 2015

(54) AUTOMATED WORKFLOW FOR 3D CORE DIGITAL MODELING FROM COMPUTERIZED TOMOGRAPHY SCANNER (CTS) IMAGES

(71) Applicant: Saudi Arabian Oil Company, Dhahran (SA)

(72) Inventor: Mokhles Mustapha Mezghani, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 14/315,845

(22) Filed: Jun. 26, 2014

(65) Prior Publication Data

US 2015/0146935 A1 May 28, 2015

Related U.S. Application Data

(60) Provisional application No. 61/909,212, filed on Nov. 26, 2013.

(51) Int. Cl.
*G06T 7/00* (2006.01)
*G06T 7/60* (2006.01)
*G06T 17/10* (2006.01)

(52) U.S. Cl.
CPC ............... *G06T 7/602* (2013.01); *G06T 7/0026* (2013.01); *G06T 7/0028* (2013.01); *G06T 7/0065* (2013.01); *G06T 7/0067* (2013.01); *G06T 7/0085* (2013.01); *G06T 7/0097* (2013.01); *G06T 17/10* (2013.01); *G06T 2200/08* (2013.01); *G06T 2207/10081* (2013.01); *G06T 2207/30181* (2013.01); *G06T 2210/22* (2013.01)

(58) Field of Classification Search
None
See application file for complete search history.

(56) References Cited

U.S. PATENT DOCUMENTS 5,277,062 A * 1/1994 Blauch .................. E21B 47/026
166/250.1
5,442,735 A 8/1995 Paradine
(Continued)

OTHER PUBLICATIONS

"SGeMS Stanford Geostatistical Modeling Software" retrieved at http://sgems.sourceforge.net, 2010, 2 pages.
(Continued)

*Primary Examiner* — Jon Chang
(74) *Attorney, Agent, or Firm* — Bracewell & Giuliani LLP; Constance Gall Rhebergen; Brad Y. Chin

(57) ABSTRACT

Computer-implemented methods, systems, and non-transitory computer-readable medium having computer program stored therein are provided to enhance the accuracy and efficiency of modeling a core sample from images of two-dimensional transverse sections of a core sample. Embodiments of the invention include, for example, image registering a plurality of images of transverse sections of a core sample to produce aligned transverse sections by approximating the circular location of the boundary of the transverse section and aligning the images based on center points of the approximated circles. Embodiments can further include, for example, performing a saw cut correction on the aligned transverse section images to adjust the images for the slab cut, generating a three-dimensional simulated model of the core sampling using one or more of the saw cut line corrected images, and generating a three-dimensional simulated model of the internal composition of a borehole related to the core sample using multipoint statistics calculations.

20 Claims, 37 Drawing Sheets
(3 of 37 Drawing Sheet(s) Filed in Color)

(56) References Cited

U.S. PATENT DOCUMENTS

| | | | |
|---|---|---|---|
| 5,896,464 | A | 4/1999 | Horiuchi et al. |
| 6,106,561 | A | 8/2000 | Farmer |
| 7,133,551 | B2 | 11/2006 | Chen et al. |
| 8,050,892 | B2 | 11/2011 | Hartman |
| 8,374,234 | B2 | 2/2013 | Munoz et al. |
| 8,385,604 | B2 | 2/2013 | Orpen |
| 8,588,547 | B2 | 11/2013 | Giuffrida et al. |
| 2004/0141583 | A1 | 7/2004 | Siddiqui |
| 2006/0079772 | A1* | 4/2006 | Ichikawa ............... A61B 8/12 600/437 |
| 2007/0061079 | A1 | 3/2007 | Hu |
| 2010/0324868 | A1 | 12/2010 | Russell et al. |
| 2013/0259190 | A1 | 10/2013 | Walls et al. |
| 2013/0279752 | A1 | 10/2013 | Thomas et al. |
| 2013/0308831 | A1 | 11/2013 | Dvorkin et al. |
| 2014/0099012 | A1* | 4/2014 | Begin ...................... G06T 5/006 382/131 |
| 2014/0111519 | A1 | 4/2014 | Block et al. |

OTHER PUBLICATIONS

Christie, Michael A. "Upscaling for Reservoir Simulation" SPE 37324, JPT, vol. 48, No. 11, Nov. 1996, pp. 1004-1010.

Dehghani et al. "Modeling a Vuggy Carbonate Reservoir" AAPG Bulletin, vol. 83, No. 1, Jan. 1999, pp. 19-42.

Durlofsky, Louis J. "Upscaling of Geocellular Models for Reservoir Flow Simulation: A Review of Recent Progress" 7th International Forum on Reservoir Simulation, Buhl/Baden-Baden, Germany, Jun. 23-27, 2003, pp. 1-58.

Hurley et al. "Method to Generate Full-Bore Images Using Borehole Images and Multipoint Statistics" SPE 120671, SPE Middle East Oil and Gas Show and Conference, Bahrain, Bahrain, Mar. 15-18, 2009, pp. 204-214.

Schlumberger, Software "Petrel Facies Modeling" retrieved at http://www.slb.com/services/software/geo/petrel/geomodeling/facies_modeling.aspx, Oct. 4, 2013, 2 pages.

Weeks, Eric "How does a confocal microscope work?" retrieved at http://www.physics.emory.edu/faculty/weeks//confocal, 2007, 6 pages.

Wikipedia "Image registration" retrieved at http://en.wikipedia.org/wiki/Image_registration, Oct. 25, 2013, 6 pages.

Zhang et al. "Numerical Modeling of Heterogeneous Carbonates and Multi-Scale Dynamics" SPWLA 50th Annual Logging Symposium, The Woodlands, Texas, Jun. 21-24, 2009, pp. 1-12.

Zhang, Tuanfeng "Filter-Based Training Pattern Classification for Spatial Pattern Simulation" Ph.D. Dissertation, Stanford University, Palo Alto, California, Mar. 2006, 146 pages.

Baek et al. "A 3-D Tube Scanning Technique Based on Axis and Center Alignment of Multi-laser Triangulation" Lecture Notes in Computer Science (LNCS), vol. 6915, Ch. 65, No. 558, Springer-Verlag Berlin Heidelberg, Aug. 22, 2011, pp. 724-735, XP047266404.

International Search Report and Written Opinion for PCT/US2014/066308 dated Mar. 13, 2015.

International Search Report and Written Opinion for PCT/US2014/066313 dated Mar. 13, 2015.

Ketcham et al. "Acquisition, optimization and interpretation of X-ray computed tomographic imagery: applications to the geosciences" Computers & Geosciences, vol. 27, No. 4, May 1, 2001, pp. 381-400, XP055110459.

Silin et al. "Final Report to RPSEA—Petrophysical Studies of Unconventional Gas Reservoirs Using High-resolution Rock Imaging, Project No. 07122-22.FINAL" Nov. 30, 2012, 72 pages, XP055173825.

Rathod, a. "Petrophysical Analysis of the Thamama Group, Abu Dhabi, U.A.E." M.S. thesis, Colorado School of Mines, 2003, 193 pages.

Schindler, J. "Quantification of Vuggy Porosity Using Borehole Images, Nuclear Magnetic Resonance, and Core Data, Indian Basin Field, New Mexico" M.S. thesis, Colorado School of Mines, 2005, 235 pages.

\* cited by examiner

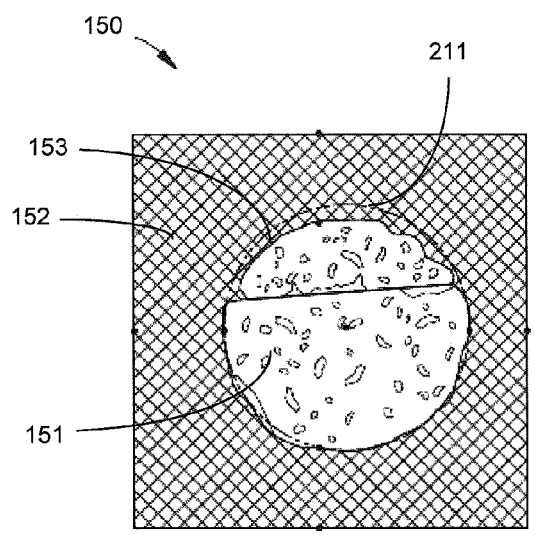 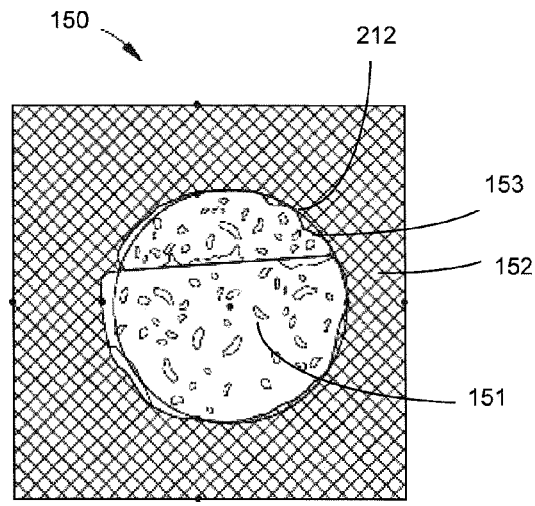
FIG. 14A  FIG. 14B
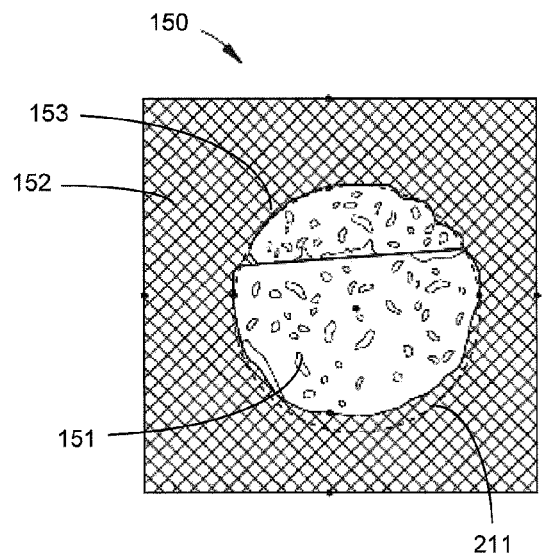 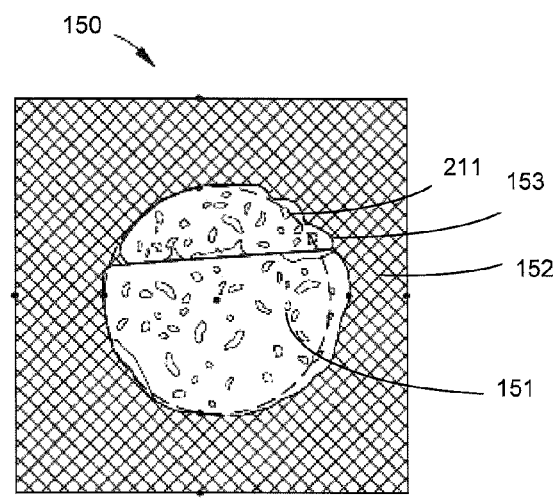
FIG. 14C  FIG. 14D

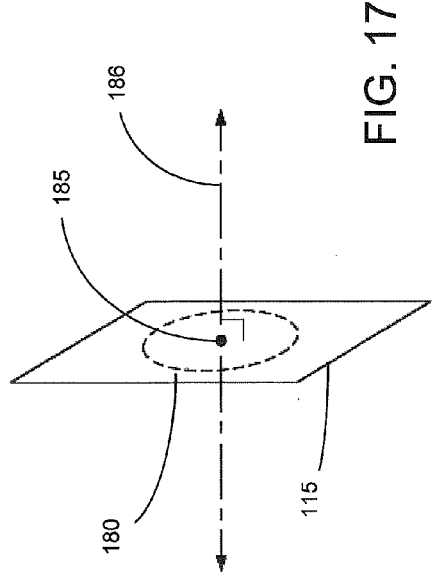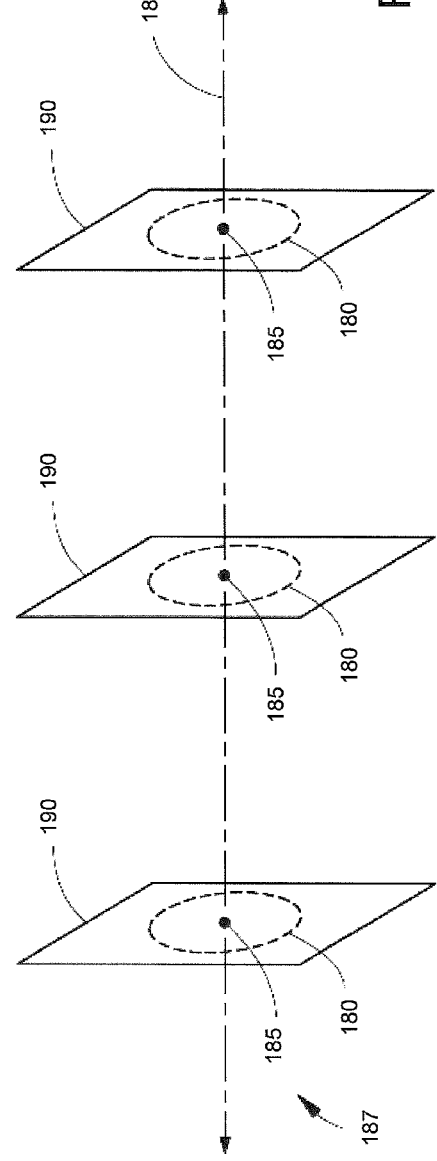

AUTOMATED WORKFLOW FOR 3D CORE DIGITAL MODELING FROM COMPUTERIZED TOMOGRAPHY SCANNER (CTS) IMAGES

RELATED APPLICATIONS

This application claims priority to and the benefit of U.S. Provisional Patent Application No. 61/909,212 titled "Automated Workflow for 3D Core Digital Modeling From Computerized Tomography Scanner (CTS) Images" filed on Nov. 26, 2013, and is related to the non-provisional patent application filed on the same day as this application, Jun. 26, 2014, with the same above inventor and titled "Automated Saw Cut Correction for 3D Core Digital Modeling From Computerized Tomography Scanner (CTS) Images," each of which is incorporated herein by reference in its entirety.

BACKGROUND OF THE INVENTION

1. Field of Invention

Claimed embodiments of the invention relate to oil and gas reservoir modeling and more particularly to computer-implemented methods, systems, and non-transitory computer-readable medium having one or more computer programs stored therein to model a core sample or other rock sample.

2. Background of the Invention

A reservoir can be digitally modeled so as to reflect all of the reservoir's characteristics related to its ability to store and produce hydrocarbons. Once completed, a reservoir model can be used to run flow simulations to predict, for example, residual oil saturations or recovery factors. These models, also called simulations, may be static or dynamic. Static models are fine-scale reservoir models of rock properties such as, for example, porosity, permeability, capillary pressure, fractures, faults, seismic attributes, and parameters that do not change significantly with time. Dynamic models, on the other hand, are coarser models. They incorporate fluid dynamic properties that change with time, such as, for example, pressure and flow rates of hydrocarbons and water. Static models are sometimes called reservoir-description grids or simply geological models, while dynamic models are sometimes called simulation grids.

Reservoir models may vary in scale from one another by as many as twelve orders of magnitude. For instance, one model might include pores, which can be measured in nanometers, while another model might represent a full oil field, which can be measured in kilometers. Highly-detailed models are often unsuitable for simulations. Consequently, detailed models are sometimes "scaled up" or "coarsened;" this process is referred to as "upscaling." Upscaling is accomplished through the use of various algorithms. After upscaling has occurred, detailed features are no longer represented, but broader characteristics are still represented in the model.

Reservoir models can be developed in a variety of ways and from a variety of data sources. For example, some models are developed from borehole images. Borehole images can be acquired through several techniques. One such technique is to use electrode pads placed against the wellbore wall around the wellbore to force a current through the rock; sensors can then measure the current and map resistivities of the material surrounding the wellbore. The readings can then be used to develop an image of the material and features, e.g., vugs, that make up the sampled portions of the wellbore wall. Statistical techniques such as multipoint statistics (MPS) can be used to model the full wellbore wall, including gaps between the sampled images. MPS employs "training images" as templates in modeling reservoir properties. Training images can be existing geological interpretations, but they do not need to be.

Another method of modeling a reservoir is the numerical pseudocores method. In that method, numerical pseudocores are three-dimensional models derived from both borehole images and digital rock samples. The method utilizes MPS, and the digital rock samples serve as training images.

Digital rock samples—digital representations of core samples or other rock samples—can be constructed from image sets obtained by, for example, x-ray computed tomography (CT) scan (CTS), micro-CT scan, or confocal microscopy. To obtain image sets by CTS, an x-ray is passed through two-dimensional transverse sections of a core sample from all sides of the sample, and density is calculated. Micro-CT scan similarly uses x-ray technology to obtain images. Confocal microscopy uses fluorescence properties of different materials to create images. After "scanning" a number of transverse sections of the core sample, a three-dimensional model of the sample can be constructed. The model will show the rock and its features, e.g., vugs.

To construct a model of a core sample, the scanned images of transverse sections of the core sample must often be manipulated. The process of manipulating the images, however, frequently requires subjective decision-making and variable adjustments by individuals. These factors cause the process of constructing a model to be time-consuming and result in models that are often prone to inaccuracies.

SUMMARY OF THE INVENTION

Applicant has recognized problems associated with the process of modeling a core sample and has advantageously developed computer-implemented methods, systems, and one or more non-transitory computer-readable mediums having one or more computer programs stored therein to enhance the accuracy and efficiency of modeling a core sample. Embodiments of the invention relate to image manipulation to develop models of a core sample or other rock sample that can be used, for example, to generate numerical pseudocores. Rather than relying on subjective decision-making and variable adjustments by individuals, embodiments of the invention include, for example, elegant automated techniques that enhance the image manipulation and modeling process by reducing inaccuracies and increasing time efficiency.

Embodiments of the invention include computer-implemented methods of processing two-dimensional images of two-dimensional transverse sections of a real, three-dimensional, substantially cylindrical core sample of subsurface material so as to be able to simulate a three-dimensional model of the core sample. Methods can include image registering the images to align the images along an appropriate axis for modeling, removing surface artifact by cropping portions of the images that result from noise, and generating a model of the core sample from the images. To image register the images, methods can include approximating circular location of peripheries of the representation of a transverse section in an image to produce an approximated circular boundary. Peripheries of the representation are a boundary between a representation of a transverse section in an image and a background that substantially surrounds the representation. Methods can also include selecting a center point of the approximated circle in each image to serve as a reference point for each representation of a transverse section, determining a simulated axis that is an imaginary line that passes through the reference point of the representation of one transverse section and extends substantially perpendicularly to the plane of that representation of a transverse section, and aligning each reference point on the simulated axis, with each representation of the transverse sections arranged in sequential order. To remove surface artifact, methods can include cropping a portion of each of the aligned transverse sections such that they form simulated peripheries to be substantially similar in size, thereby producing a plurality of cropped aligned transverse sections that include the aligned transverse sections and exclude the cropped portions. Methods can also include generating a simulated model of the core sample that includes the cropped aligned transverse sections in their sequential order. The model can be three-dimensional, and it can depict the internal composition of the structural characteristics of the core sample, including vugs and pores within the material, for example. Methods can further include approximating circular location of the boundary for each image by determining a perpendicular bisector of each side of the images, selecting four or more points on the representation that intersects with the perpendicular bisectors, selecting at least three out of the four or more points to form an imaginary triangle for each of the four or more points, determining a circumcenter of each of the imaginary triangles, and determining a radius of a plurality of imaginary circles, the center of each of the imaginary circles being one of circumcenters of the imaginary triangles. Method embodiments can further include, for example, comparing each radius of the plurality of imaginary circles to a predetermined radius of the core sample, and selecting the circle having the smallest difference between its radius and the predetermined radius of the core sample as the approximated circular boundary.

Embodiments of the invention further include computer-implemented methods of performing a saw-cut correction when, for example, the images are digital images having a plurality of pixels and the core sample has a slab cut (e.g., a portion of the sample removed when the sample was cut from the borehole). Methods can include, for each aligned image, discarding the background of the aligned image, identifying two or more pixels in the aligned image that have a value of zero, and determining an imaginary best-fit line for the pixels that have a value of zero to thereby identify a saw cut line. Methods can include approximating circular location of peripheries of the aligned transverse section in an aligned image to thereby identify an approximated slab cut boundary to approximate the position of a boundary between the aligned transverse section and a background substantially surrounding the aligned transverse section in the aligned image. Embodiments of the invention can further include, for example, comparing a number of non-zero pixels on a first side of the saw cut line with a number of non-zero pixels on a second side of the saw cut line. The portion of the representation with the smaller number of non-zero pixels relative to the saw cut line being the smaller portion of the representation and the larger portion being the portion of the representation associated with the larger number of non-zero pixels. Methods can further include, for example, identifying a point positioned on peripheries of the smaller portion to thereby identify a standalone point, determining an imaginary line perpendicular to the saw cut line that extends through the standalone point to thereby identify a reference line, and moving the smaller portion parallel to the reference line to position the standalone point on peripheries of the approximated circular boundary.

Embodiments of the invention also include systems to process two-dimensional images of two-dimensional transverse sections of a real, three-dimensional, substantially cylindrical core sample of subsurface material so as to be able to simulate a three-dimensional model of the core sample. Systems can include one or more processors, an input and output unit in communication with the one or more processors, one or more displays in communication with the one or more processors, and one or more non-transitory memories in communication with the one or more processors. The one or more non-transitory memories can include computer-readable instructions such as a computer program that when executed cause the system to perform a series of steps to manipulate images. The steps can include image registering the images to align the images along an appropriate axis for modeling, removing surface artifact by cropping portions of the images that result from noise, and generating a model of the core sample from the images. To image register the images, the steps can include approximating circular location of peripheries of the representation of a transverse section in an image to produce an approximated circle. The steps can also include selecting a center point of the approximated circle in each image to serve as a reference point for each representation of a transverse section, determining a simulated axis that is an imaginary line that passes through the reference point of the representation of one transverse section and extends substantially perpendicularly to the plane of that representation of a transverse section, and aligning each reference point on the simulated axis, with each representation of the transverse sections arranged in sequential order. To remove surface artifact, the steps can include cropping a portion of each of the aligned transverse sections such that they form simulated peripheries to be substantially similar in size, thereby producing a plurality of cropped aligned transverse sections that include the aligned transverse sections and exclude the cropped portions. The steps can also include generating a simulated model of the core sample that includes the cropped aligned transverse sections in their sequential order. The model can be three-dimensional, and it can depict the internal composition of the structural characteristics of the core sample, including vugs and pores within the material, for example.

The steps can further include approximating circular location of the boundary for each image by determining a perpendicular bisector of each side of the images, selecting four or more points on the representation that intersects with the perpendicular bisectors, selecting at least three out of the four or more points to form an imaginary triangle for each of the four or more points, determining a circumcenter of each of the imaginary triangles, and determining a radius of a plurality of imaginary circles, the center of each of the imaginary circles being one of circumcenters of the imaginary triangles. The steps can further include, for example, comparing each radius of the plurality of imaginary circles to a predetermined radius of the core sample, and selecting the circle having the smallest difference between its radius and the predetermined radius of the core sample as the approximated circular boundary.

The steps can also include performing a saw-cut correction when, for example, the images are digital images having a plurality of pixels and the core sample has a slab cut and is a slab cut core sample. The steps can include, for each aligned image, discarding the background of the aligned image, identifying two or more pixels in the aligned image that have a value of zero, and determining an imaginary best-fit line for the pixels that have a value of zero to thereby identify a saw cut line. The steps can include approximating circular location of peripheries of the aligned transverse section in an aligned image to thereby identify an approximated slab cut circular boundary. The steps can further include, for example, comparing a number of non-zero pixels on a first side of the saw cut line with a number of non-zero pixels on a second side of the saw cut line. The portion of the representation with the smaller number of non-zero pixels relative to the saw cut line being the smaller portion of the representation and the larger portion being the portion of the representation associated with the larger number of non-zero pixels. The steps can further include, for example, identifying a point positioned on peripheries of the smaller portion to thereby identify a standalone point, determining an imaginary line perpendicular to the saw cut line that extends through the standalone point to thereby identify a reference line, and moving the smaller portion parallel to the reference line to position the standalone point on peripheries of the approximated circular boundary.

A system according to embodiments of the invention can also include a core sample imaging device that can capture images of transverse sections of a core sample, such as, for example, a computerized tomography scanner. The steps can then further include capturing a plurality of images before image registering the images.

Embodiments of the invention include non-transitory computer-readable medium, such as computer memories, that has computer program stored therein that when executed causes a computer to take steps to process two-dimensional images of two-dimensional transverse sections of a real, three-dimensional, substantially cylindrical core sample so as to be able to simulate a three-dimensional model of the core sample. The steps can include image registering the images to align the images along an appropriate axis for modeling, removing surface artifact by cropping portions of the images that result from noise, and generating a model of the core sample from the images. To image register the images, the steps can include approximating circular location of peripheries of the representation of a transverse section in an image to produce an approximated circle. Peripheries of the representation are a boundary between a representation of a transverse section in an image and a background that substantially surrounds the representation. The steps can also include selecting a center point of the approximated circle in each image to serve as a reference point for each representation of a transverse section, determining a simulated axis that is an imaginary line that passes through the reference point of the representation of one transverse section perpendicularly to the plane of that representation of a transverse section, and aligning each reference point on the simulated axis, with each representation of the transverse sections arranged in sequential order. To remove surface artifact, the steps can include cropping a portion of each of the aligned transverse sections such that they form simulated peripheries to be substantially similar in size, thereby producing a plurality of cropped aligned transverse sections that include the aligned transverse sections and exclude the cropped portions. The steps can also include generating a simulated model of the core sample that includes the cropped aligned transverse sections in their sequential order. The model can be three-dimensional, and it can depict the internal composition of the structural characteristics of the core sample, including vugs and pores within the material, for example.

The steps can further include approximating circular location of the boundary to thereby identify an approximated circle for each image by determining a perpendicular bisector of each side of the images, selecting four or more points on the representation that intersects with the perpendicular bisectors, selecting at least three out of the four or more points to form an imaginary triangle for each of the four or more points, determining a circumcenter of each of the imaginary triangles, and determining a radius of a plurality of imaginary circles, the center of each of the imaginary circles being one of circumcenters of the imaginary triangles. Method embodiments can further include, for example, comparing each radius of the plurality of imaginary circles to a predetermined radius of the core sample, and selecting the circle having the smallest difference between its radius and the predetermined radius of the core sample as the approximated circular boundary.

Embodiments of the invention further include non-transitory computer-readable medium having computer program stored therein that when executed causes a computer to further take steps to perform a saw-cut correction when, for example, the images are digital images having a plurality of pixels and the core sample has a slab cut. The steps can include, for each aligned image, discarding the background of the aligned image, identifying two or more pixels in the aligned image that have a value of zero, and determining an imaginary best-fit line for the pixels that have a value of zero to thereby identify a saw cut. The steps can include approximating circular location of peripheries of the aligned transverse section in an aligned image to thereby identify an approximated slab cut circle to approximate the position of a boundary between the aligned transverse section and a background substantially surrounding the aligned transverse section in the aligned image, identifying a portion of an aligned transverse section positioned to have the boundary of the aligned transverse section the portion substantially within a region that is enclosed by the approximated slab cut circle and the saw cut to thereby identify a detached portion, and identifying a point positioned on the detached portion and on the boundary between the representation of the aligned transverse section and the background that substantially surrounds it to thereby identify a standalone point. The steps can further include determining an imaginary line that is perpendicular to the saw cut and passes through the standalone point to thereby identify a reference line and moving the detached portion parallel to the reference line and away from the saw cut such that the standalone point is positioned on the approximated slab cut circle.

BRIEF DESCRIPTION OF THE DRAWINGS

The application file contains at least one drawing executed in color. Copies of this patent application publication with color drawings will be provided by the Patent and Trademark Office upon request and payment of the necessary fee.

FIGS. 14A-D each illustrates a schematic diagram of an image of a transverse section of a core sample according to an embodiment of the invention.

FIG. 17 is a schematic diagram of an image of a transverse section of a core sample according to an embodiment of the invention.

FIG. 18 is a schematic diagram of a set of aligned images of transverse sections of a core sample according to an embodiment of the invention.

DETAILED DESCRIPTION OF THE INVENTION

So that the manner in which the features and advantages of the embodiments of methods, systems, and non-transitory computer-readable medium having computer program stored therein of the present invention, as well as others, which will become apparent, may be understood in more detail, a more particular description of the embodiments of methods, systems, and non-transitory computer-readable medium having computer program stored therein of the present invention briefly summarized above may be had by reference to the embodiments thereof, which are illustrated in the appended drawings, which form a part of this specification. It is to be noted, however, that the drawings illustrate only various embodiments of the embodiments of methods, systems, and non-transitory computer-readable medium having computer program stored therein of the present invention and are therefore not to be considered limiting of the embodiments of methods, systems, and non-transitory computer-readable medium having computer program stored therein of the present invention's scope as it may include other effective embodiments as well.

Embodiments of the invention provide, for example, image manipulation to develop models of a core sample (or other rock sample) to generate numerical pseudocores. Rather than relying on subjective decision making or variable adjustments by individuals, embodiments of the invention provide, for example, automated techniques that enhance the image manipulation and modeling processes by reducing inaccuracies and increase time efficiency. More specifically, embodiments of the invention include, for example, systems, non-transitory memories having one or more computer programs stored therein, and computer-implemented methods of processing a plurality of two-dimensional images of a core sample to simulate a three-dimensional model of the core sample.

Figure 1:
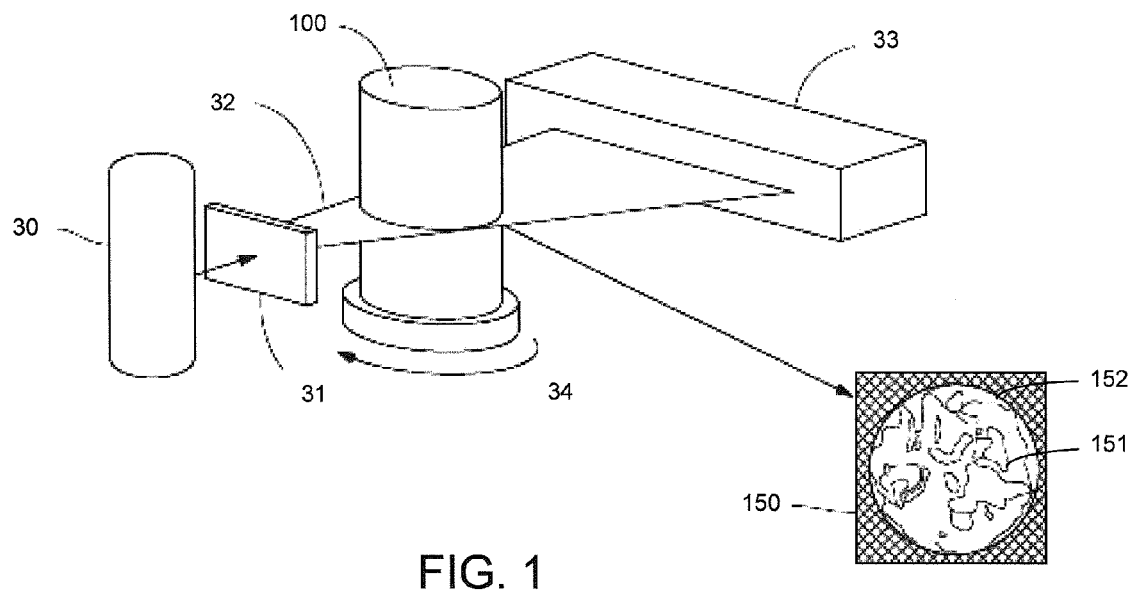
FIG. 1 is a schematic diagram of a system to manipulate images of two-dimensional transverse sections of a core sample according to an embodiment of the invention.
Figure 2:
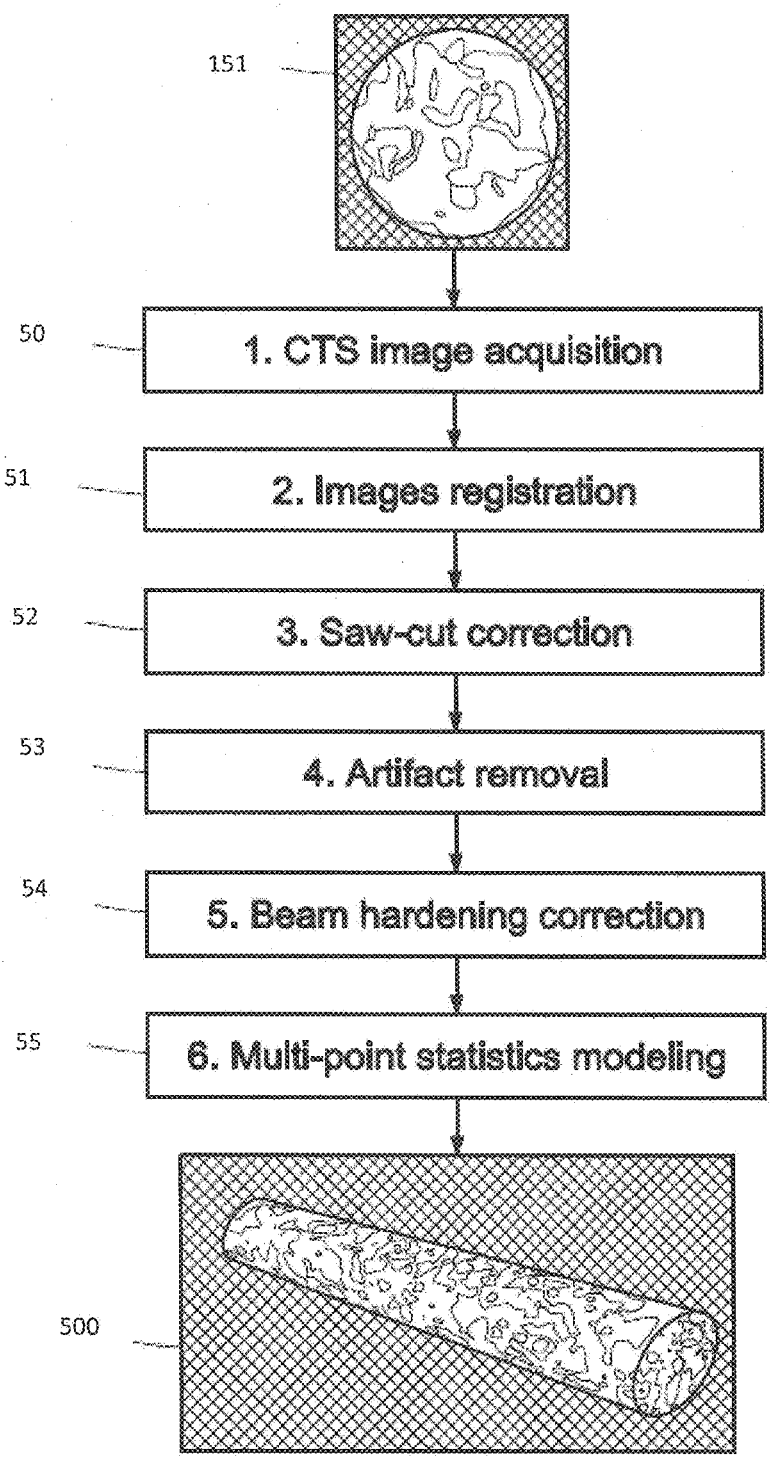
FIG. 2 is a schematic method flow diagram of a method to process images of two-dimensional transverse sections of a core sample according to an embodiment of the invention.
Figure 4:
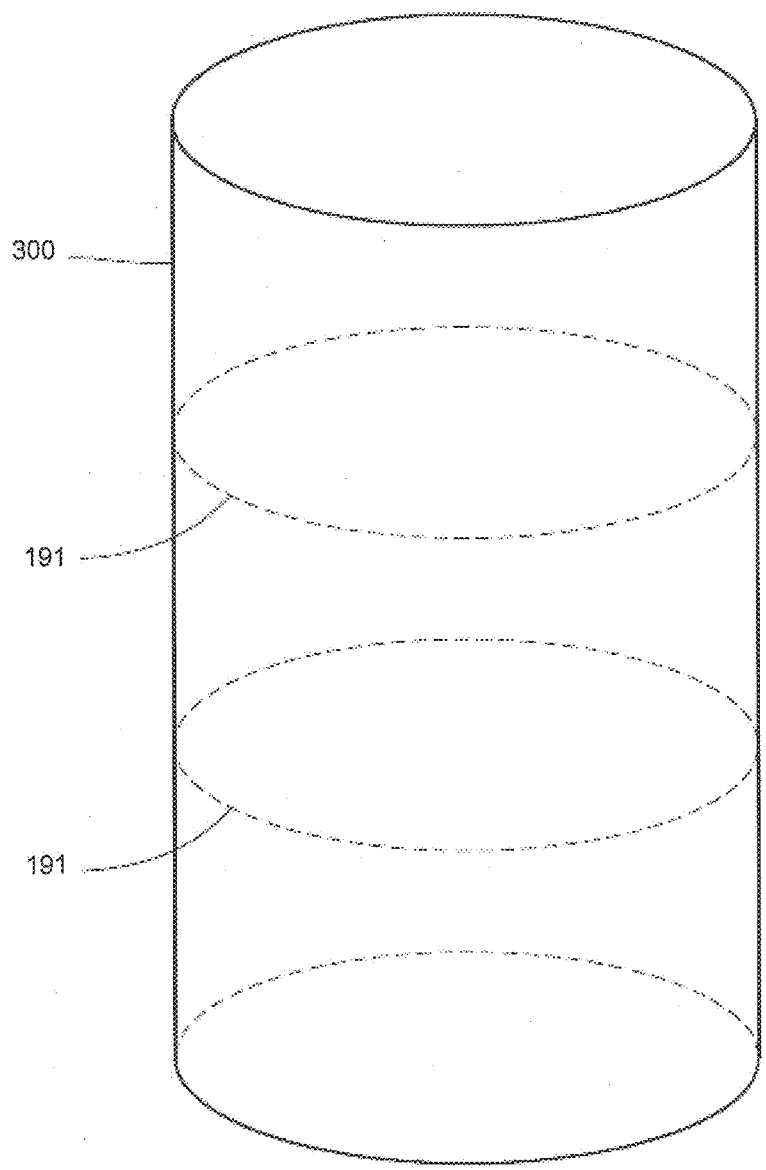
FIG. 4 is a schematic diagram of a core sample model according to an embodiment of the invention.

To simulate a three-dimensional model of a real, three-dimensional, substantially cylindrical core sample, a plurality of two-dimensional images of transverse sections of the core sample are processed or manipulated. For example, images of transverse sections of the core sample can be acquired by a computerized tomography (CT) scanner or other image device as illustrated in FIG. 1, for example. After the CT images are acquired 50, the images can undergo an image registration process 51 as illustrated in FIG. 2. Next, the images can undergo a saw cut correction 52, followed by an artifact removal 53, and a beam hardening correction 54. The results can be a core sample model 300, as illustrated in FIG. 4, for example, which can be used as a training image for multi-point statistics modeling 55 to produce a borehole model 500.

Figure 35:
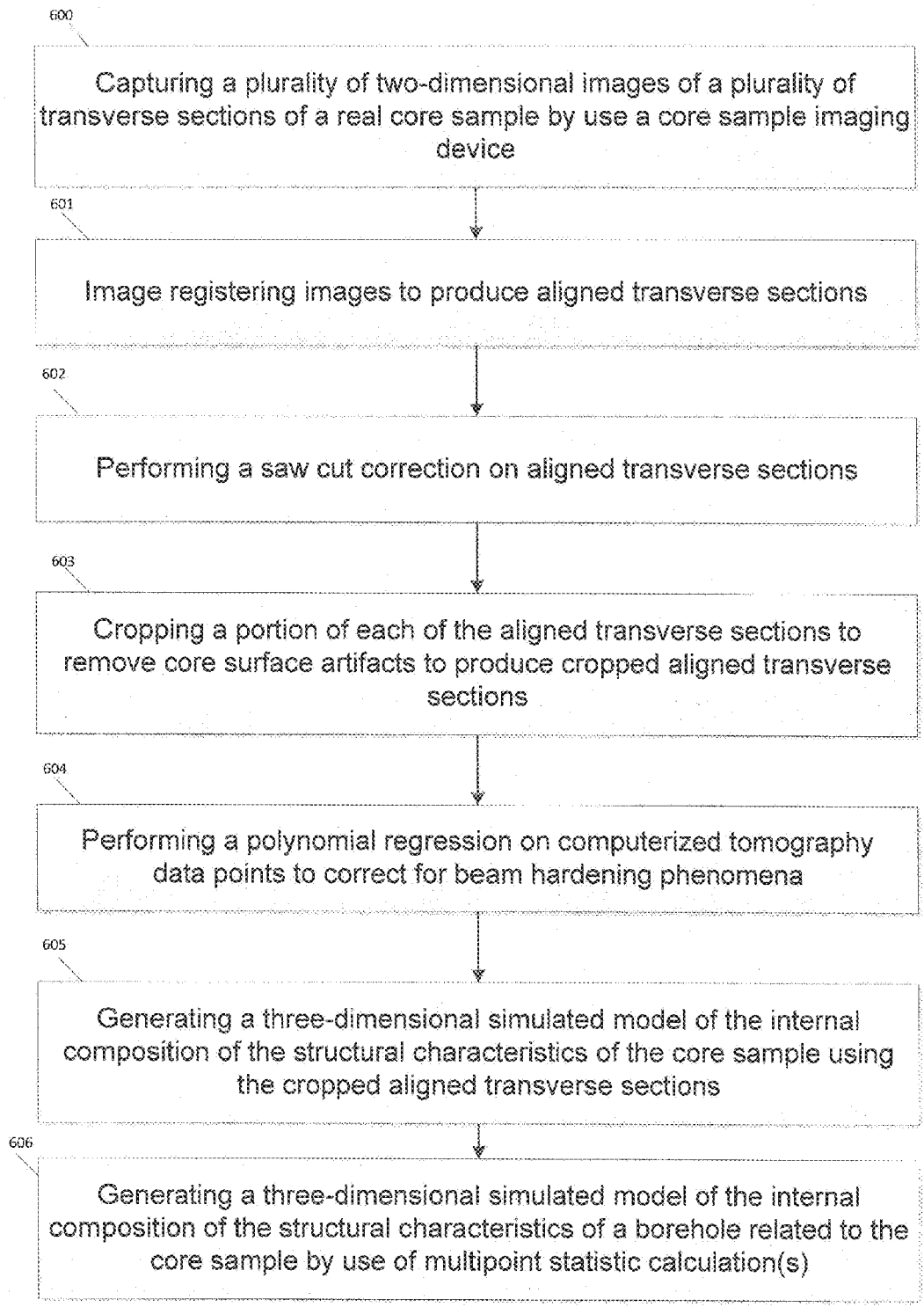
FIG. 35 is a schematic method flow diagram of a method to process images of two-dimensional transverse sections of a core sample according to an embodiment of the invention.

An overview of generating a three-dimensional simulated model of a borehole model 500, according to computer-implemented method embodiment of the invention, can be described briefly with reference to FIG. 35. A computer-implemented method embodiment can include for example, capturing in step 600, a plurality of two-dimensional images of a plurality of transverse sections of a real core sample using an imaging device, and image registering in step 601, the images to produce aligned transverse sections. After images are aligned, a computer-implemented method embodiment can further include, for example, performing a saw cut correction in step 602 on the aligned transverse sectional images. As understood by those skilled in the art, a core sample is sometimes cut with a saw or other cutting tool to facilitate removing the sample from the borehole. This causes the core sample to have two pieces that are often put together during images. However, this is not the original shape of the core sample and is therefore sometimes an undesirable processing artifact for three-dimensional modeling. Accordingly, embodiments of the invention include a saw-cut correction process 52 so that the images more accurately reflect the original shape of the core sample.

Figure 27A:
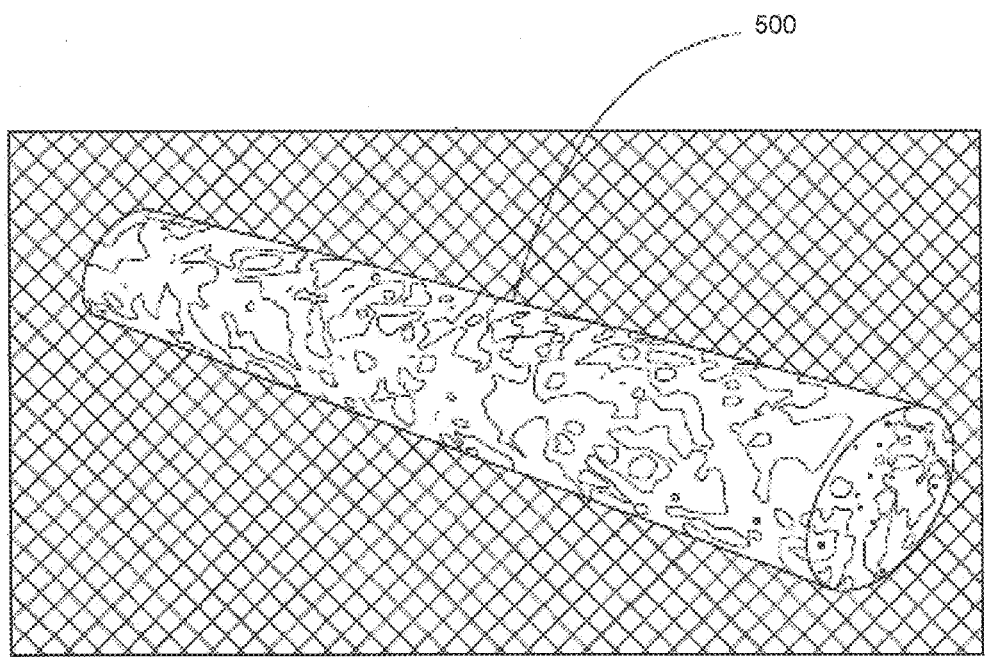
FIG. 27A is a schematic diagram of a model of a borehole according to an embodiment of the invention.
Figure 27B:
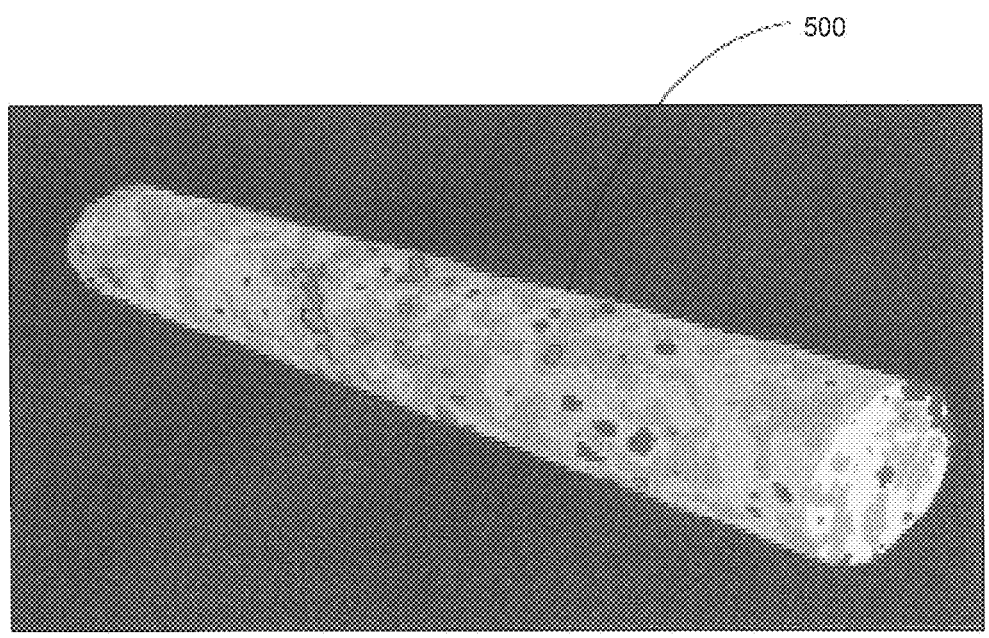
FIG. 27B is a schematic diagram of a model of a borehole according to an embodiment of the invention.

After saw-cut correction, a computer-implemented method embodiment includes, for example, cropping in step 603, a portion of each of the aligned transverse sections to remove core surface artifacts to produce cropped aligned transverse sections. Computer-implemented method embodiments can also include, for example, performing a polynominal regression in step 604, on computerized tomography data points to correct for beam hardening phenomena, as understood by those skilled in the art. Computer-implemented method embodiments can also include, for example, generating in step 605, a three-dimensional simulated model of the internal composition of the structural characteristics of the core sample using the cropped aligned transverse sections. The model 300 can depict the internal composition of the structural characteristics of the core sample 100, including vugs and pores within the material, for example. Embodiments can also include generating in step 606, a three-dimensional simulated model 500 of the internal composition of the structural characteristics of a borehole related to the core sample 100 to illustrate the borehole's interior structure and material as shown, for example, in FIGS. 27A and 27B, by using multi-point statistics techniques, utilizing a model 300 of a core sample 100 as a training image.

Figure 3:
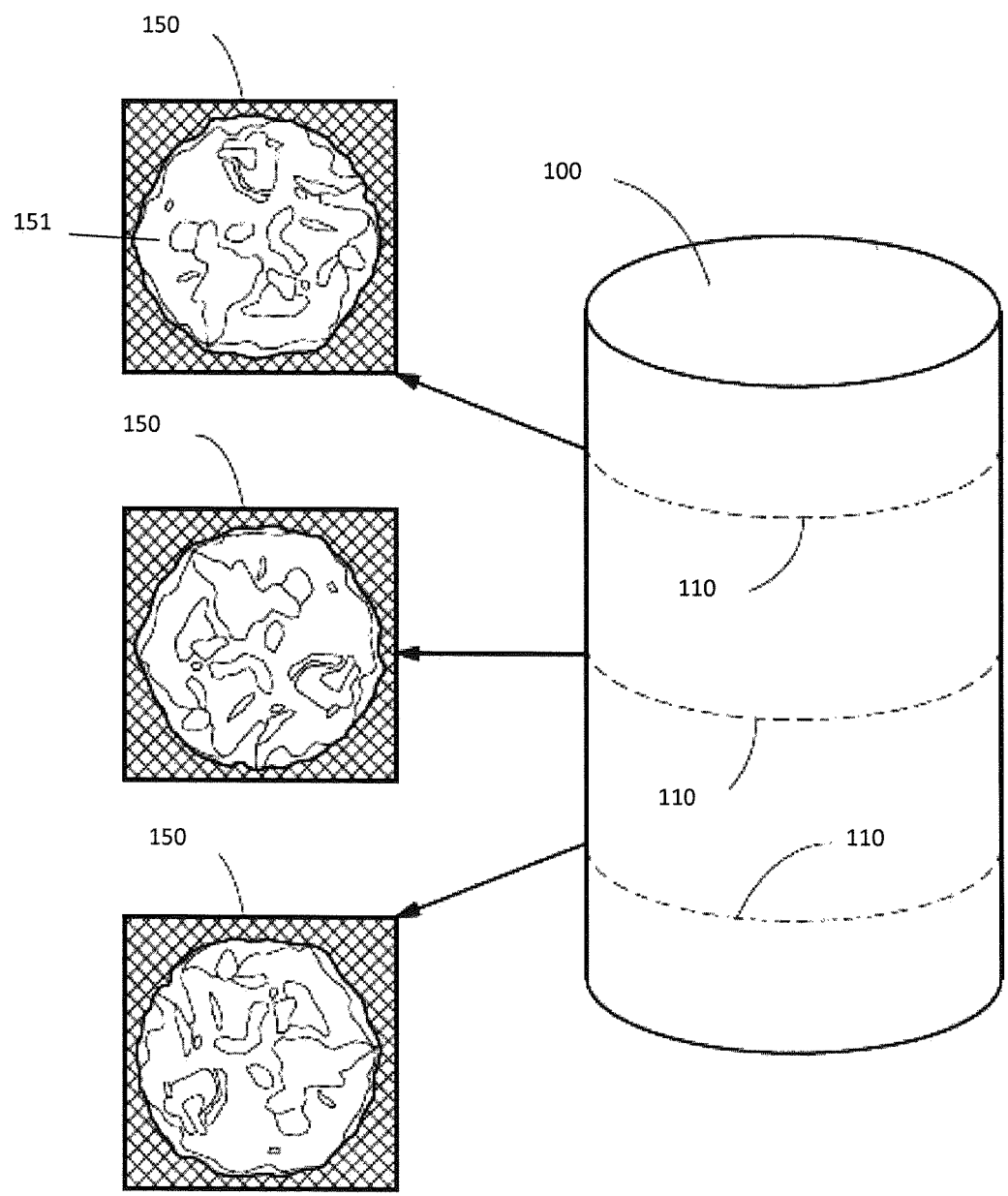
FIG. 3 is a schematic diagram of a core sample according to an embodiment of the invention.
Figure 5:
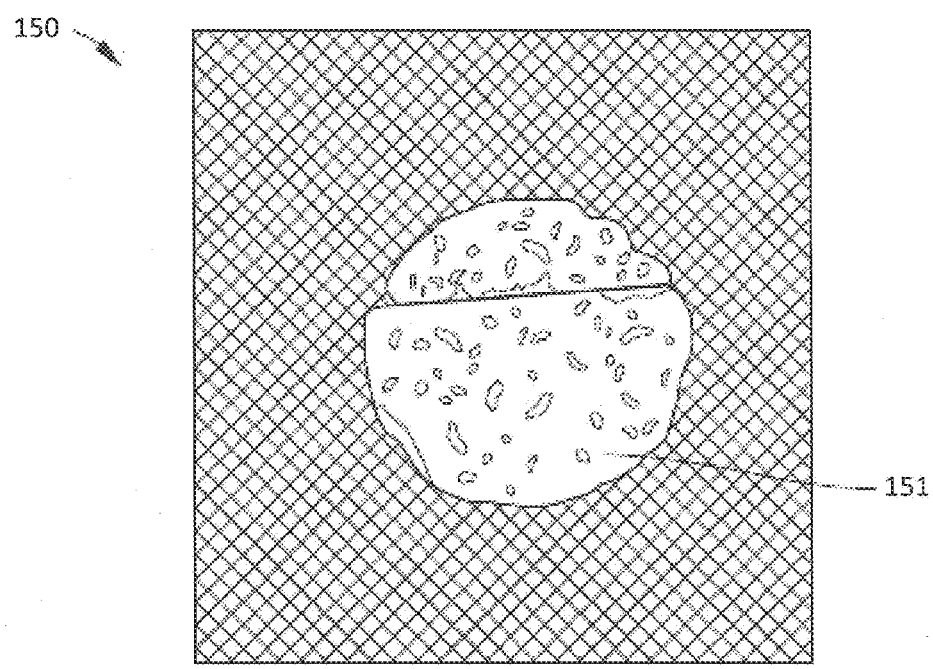
FIG. 5 is a schematic diagram of an image of a transverse section of a core sample according to an embodiment of the invention.
Figure 6:
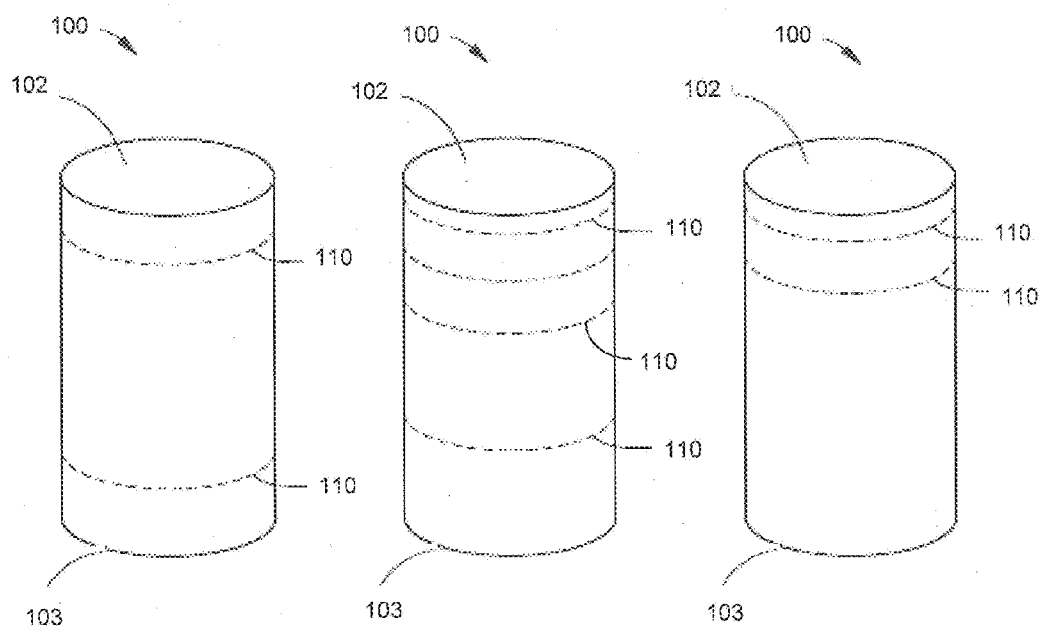
FIG. 6 is a set of schematic diagrams of core samples according to an embodiment of the invention.
Figure 7:
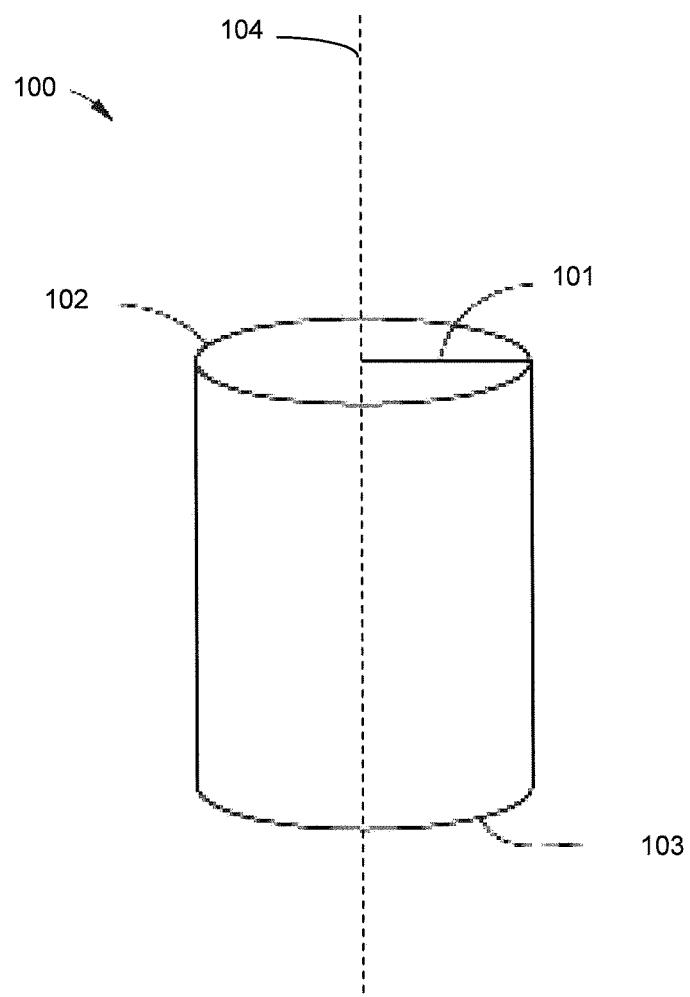
FIG. 7 is a schematic diagram of a core sample according to an embodiment of the invention.

FIG. 1 illustrates a system for processing a plurality of two-dimensional images 150 of a core sample 100 of subsurface material according to an embodiment of the invention. A computerized tomography (CT) scanner, micro-CT scan, confocal microscopy, or other imaging device can be used to acquire images 150 of the core sample 100. X-rays 32 from an x-ray source 30 pass through a collimator 31 and permeate the core sample 100 as the core sample 100 rotates 34. A detector array 33 measures the intensity of the x-rays 32 on the other side of the core sample 100 from the x-ray source 30. This produces, for example, an image 150 of a transverse section 110 of the core sample 100. This process is repeated to acquire a plurality of transverse sectional images 150 each comprised of a plurality of pixels. Each image 150, as illustrated in FIGS. 3 and 5, is polygon shaped and comprises a substantially annular representation 151 of a different transverse section 110 of the core sample and a background 152 that substantially surrounds the representation 151. One or more of the transverse sections 110 can be closer to a first 102 or second 103 end of the core sample, or positioned there between, as illustrated in FIG. 6 for example. According to some embodiments, the plurality of transverse sections 110 have a sequential order based on their individual positions within the core sample 100 from the first end 102 to the second end 103, or vice versa. The radius 101 or the diameter of the core sample can be measured to facilitate modeling. According to certain embodiments, the radius 101 of the core sample that can be determined by measuring the distance from the edges of the core sample 100 to an imaginary axis 104 of the core sample 100 that extends substantially through a medial portion of the core sample 100, as shown in FIG. 7, for example. The imaginary axis 104 can be determined by connecting the centers of the first end 102 and the second end 103 of the core sample 100.

Figure 8:
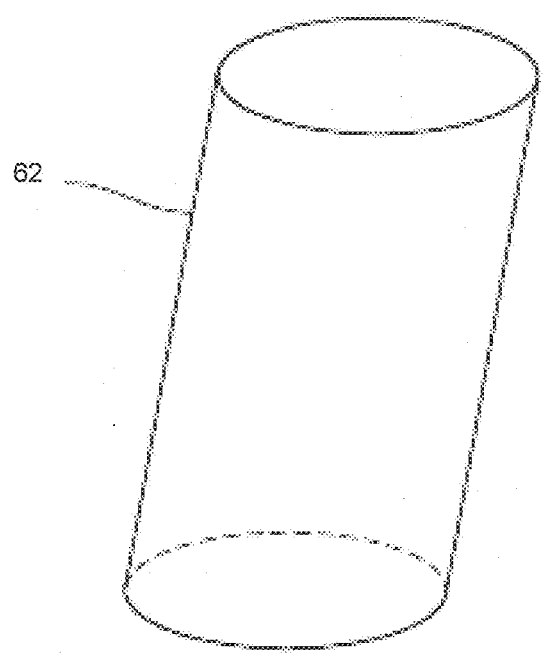
FIG. 8 is a schematic diagram of a model of an askew core sample model according to an embodiment of the invention.
Figure 9:
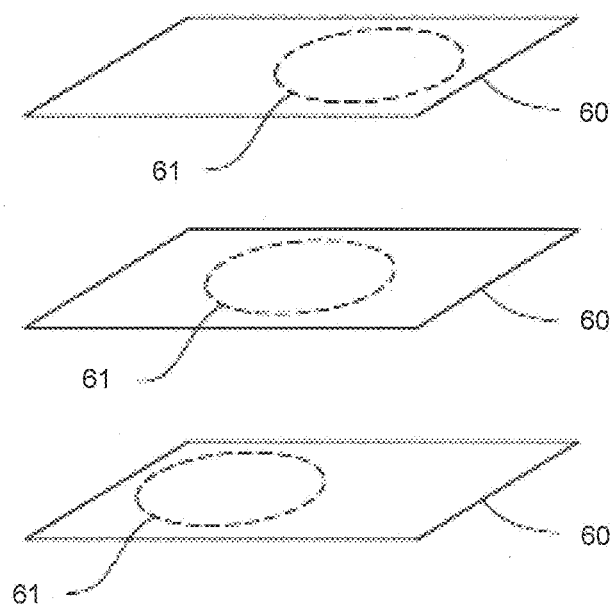
FIG. 9 is a schematic diagram of a set of images of transverse sections of an askew core sample according to an embodiment of the invention.

After the pluralities of images are captured, embodiments of the present invention can include an image registering process 51 to align the plurality of images. Assembling each image 150 on top of one another without correcting the position of the representation 151 of the transverse section 110 in the image 150 can produce an askew core sample model 62, as illustrated in FIG. 8. Uncorrected images 60, as illustrated in FIG. 9, include an approximate location 61 of a representation 151, and when the uncorrected images 60 are assembled on top of one another, they can produce an inaccurate askew core sample model. To mitigate or prevent this skewing effect, embodiments of the invention include automated image registering 51 the images to produce aligned transverse sectional images.

Figure 36:
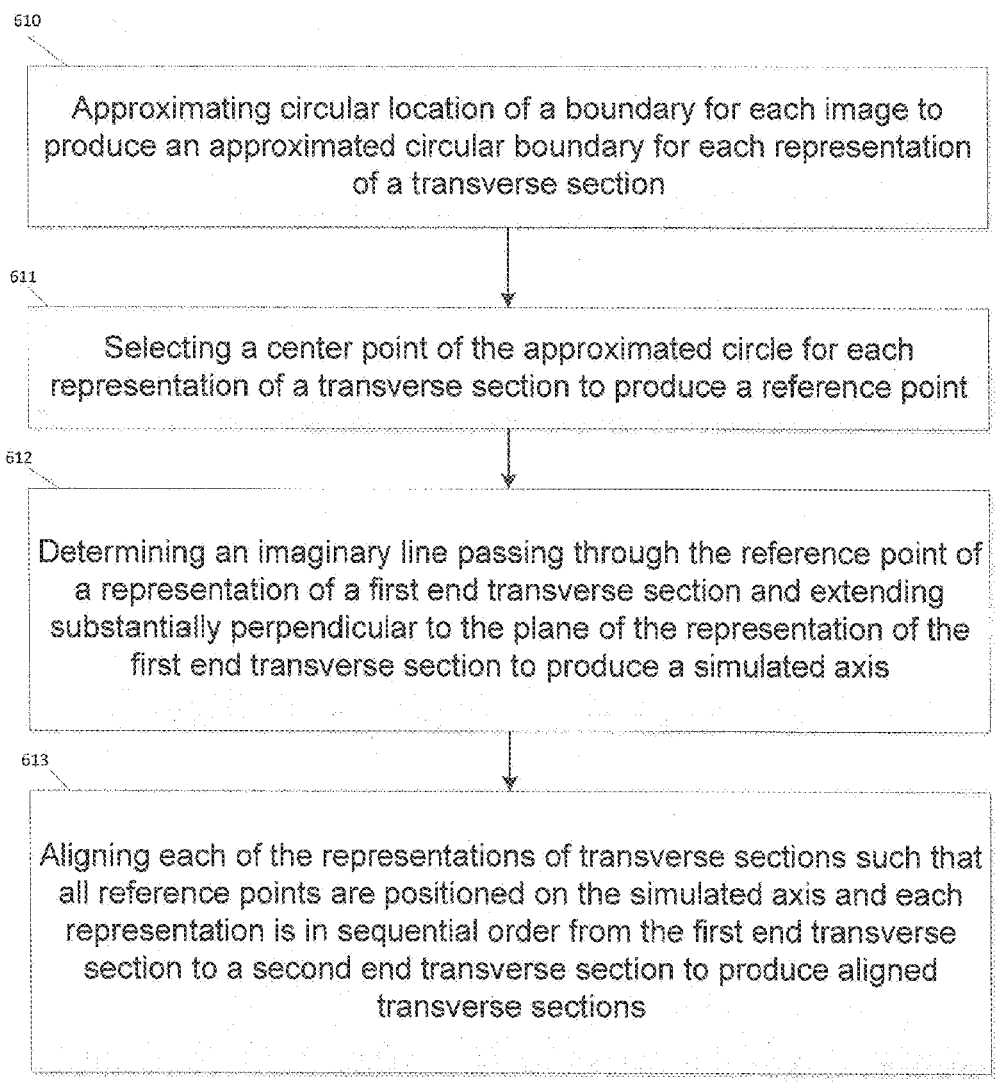
FIG. 36 is a schematic method flow diagram of a method to image register images of two-dimensional transverse sections of a core sample according to an embodiment of the invention.

General aspects of image registering images to produce aligned transverse sections, according an embodiment of the invention, can be described briefly with reference to FIG. 36. Embodiments of image registration can include, for example, approximating in step 610, the substantially circular boundary for each representation 151 of a transverse section 110, selecting in step 611, a center reference point of each of the approximated boundaries 611, determining in step 612, a simulated axis that passes through each reference point 612 to produce a simulated axis, and aligning in step 613, each of the reference points on the simulated axis to produce aligned transverse sections of the core sample. More particular aspects of image registering a plurality of images to produce aligned transverse sections, according to various embodiments, are described further herein. After the images are aligned, embodiments can further include, for example, cropping in step 603, a portion of each of the aligned transverse sections to remove core surface artifacts, and generating in step 605, a three-dimensional simulated model of the internal composition of the structural characteristics of the core sample. Each of the foregoing are described in more detailed below.

Figure 37:
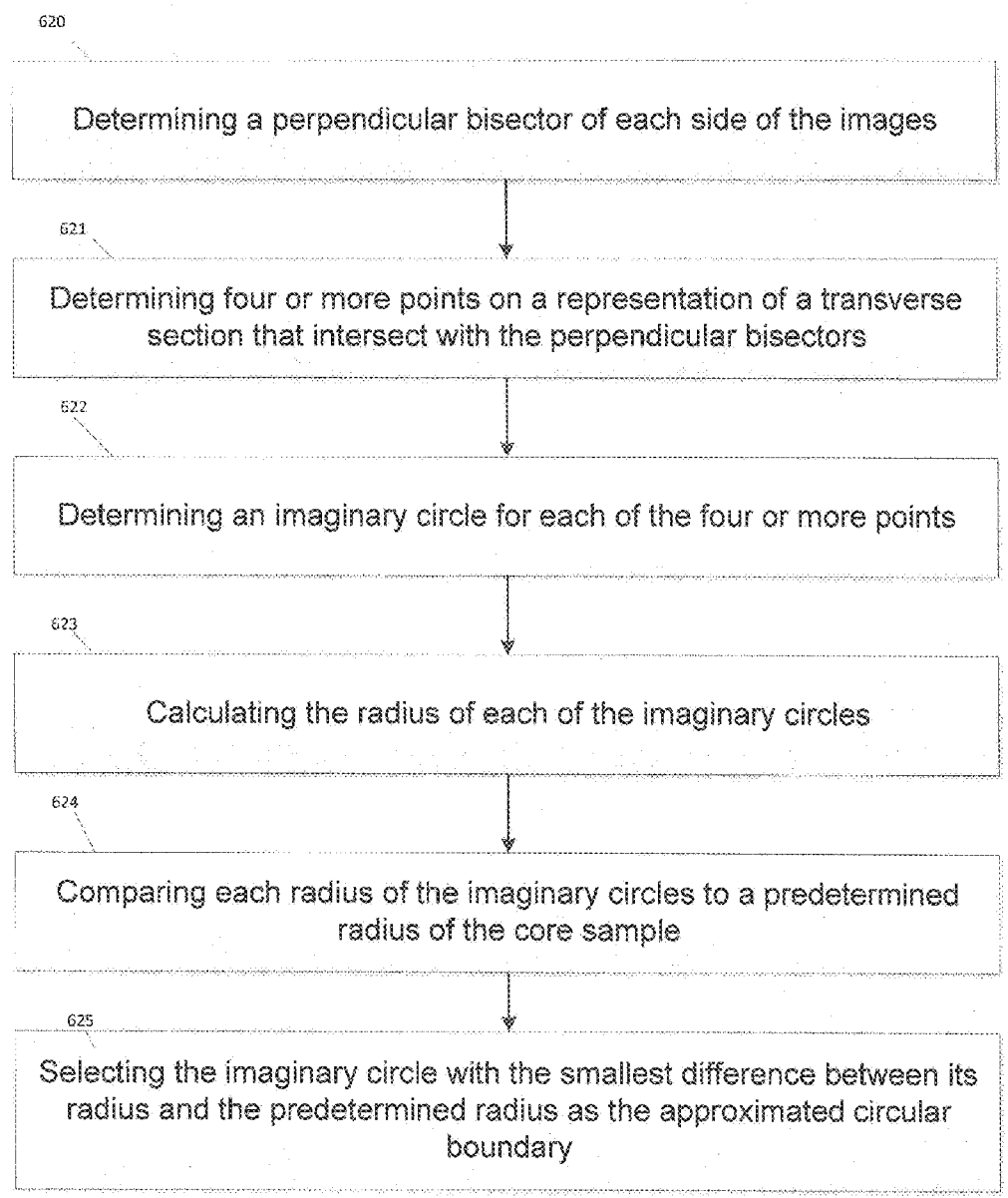
FIG. 37 is a schematic method flow diagram of a method to approximate circular location of a boundary of an image according to an embodiment of the invention.

To align the plurality of images 150, embodiments of the invention can include systems, non-transitory memories having one or more computer programs stored therein, and computer-implemented methods of approximating the substantially circular boundary 153 of the representation 151 (e.g., the outer peripheries of the depiction of the transverse section of the core sample). Approximating the circular boundary 153 according to various embodiments can be described briefly with reference to FIG. 37. Embodiments of approximating the substantially circular boundary can include, for example, the steps of determining in step 620, the perpendicular bisectors of each side of the image 150, and determining in step 621, four points on the representation 151 that intersect with the perpendicular bisectors. Embodiments of the invention can further include, for example, determining in step 622, an imaginary circle for each of the four points on the representation, calculating in step 623, the radius of each of the imaginary circles, comparing in step 624, each radius of the imaginary circles to a predetermined radius of the core sample, and selecting in step 625, the imaginary circle with the smallest difference between its radius and the predetermined radius. According to various embodiments of the invention, the approximated circular boundary 212 is the imaginary circle having the smallest difference between its radius and the predetermined radius of the core sample.

Figure 12:
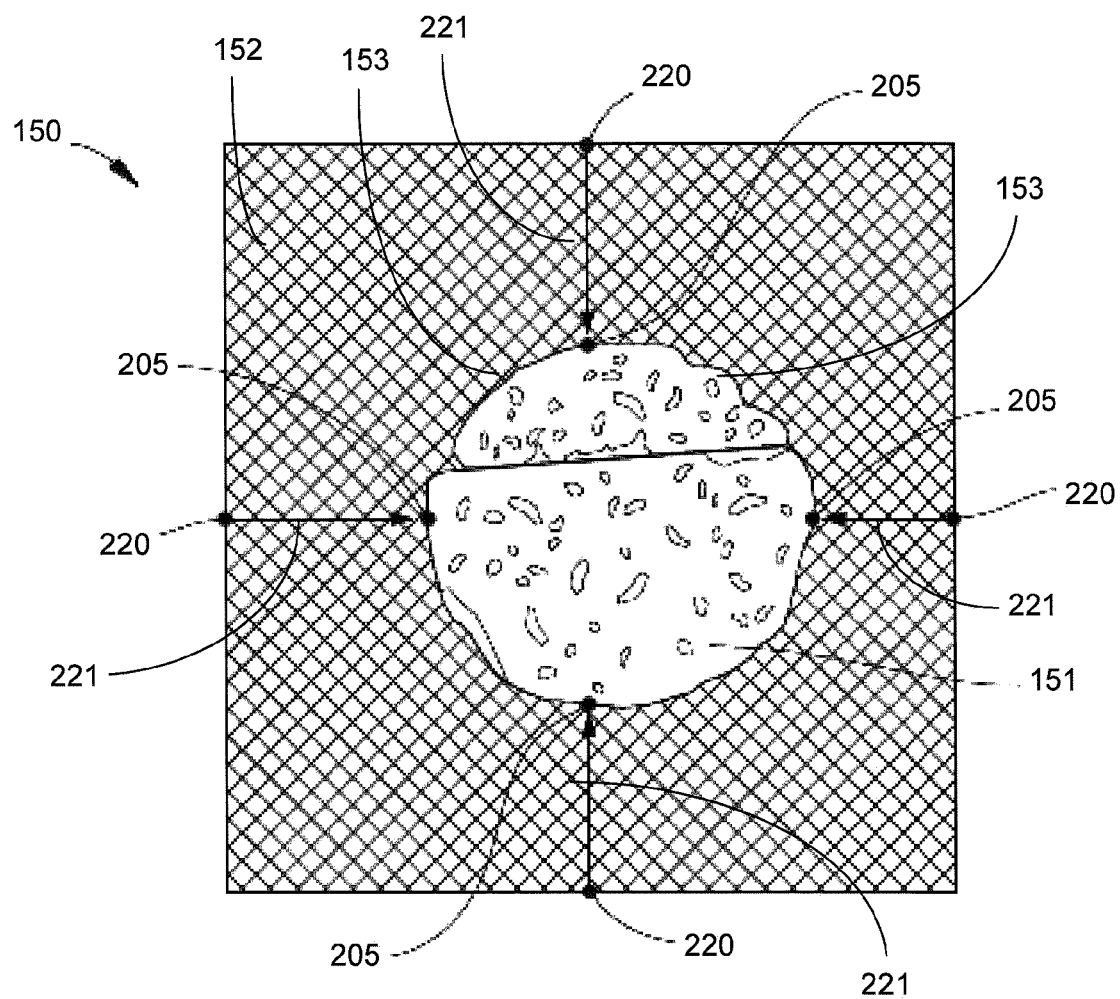
FIG. 12 is a schematic diagram of an image of a transverse section of a core sample according to an embodiment of the invention.

FIG. 12 illustrates the perpendicular bisectors 220 of a polygon shaped image 150 and four points 205 on the representation 151 that intersect with the perpendicular bisectors 220 (see e.g., line 221, which interests with points 220 and 205). The perpendicular bisectors 220 of the image, for example, can be determined by calculating the number of pixels per direction and dividing this number by half for each side of the image. Points 205 on the representation 151 are automatically determined, according to various embodiments, by locating, for example, one or more first non-zero pixels when moving from an initial position of a side of the image towards the center of the representation. Pixels that are substantially black have values that are at or near zero. Accordingly, identifying one or more first non-zero pixels (e.g., color pixels) for each side of the image will identify one or more points 205 on the boundary 153 of the representation 151 of the core sample according to an embodiment of the invention. To facilitate identifying the points 220 on the representation 151, certain embodiments include, discarding the background 152 before identifying the points 220 on the representation 151 so that the area between the sides of the image and the representation 151 is substantially void of color pixels, including, for example, dark blue.

In some embodiments, four or more points 205 on the representation 151 are selected. In other embodiments, less than four points 205 on the representation 151 are selected. In some embodiments of the invention, the points 220 on the boundary 153 of the representation 151 are determined by locating one or more first non-zero pixels. According to an exemplary embodiment, the selected points 205 on the representation 151 are perpendicular to the perpendicular bisectors 220 of the image 150 as illustrated in FIG. 12 for example. According to certain embodiments, the selected points 205 on the representation are not perpendicular to the perpendicular bisector 220 of the image 150 but are identified as being one or more first non-zero pixel and therefore on the periphery 153 of the representation 151.

Figure 38:
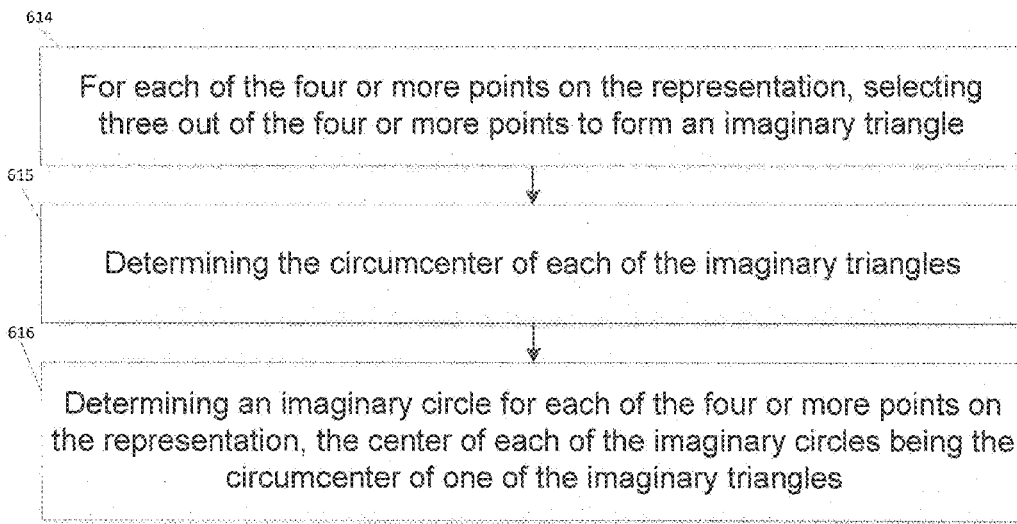
FIG. 38 is a schematic method flow diagram of a method to determine imaginary circles according to an embodiment of the invention.
Figure 44:
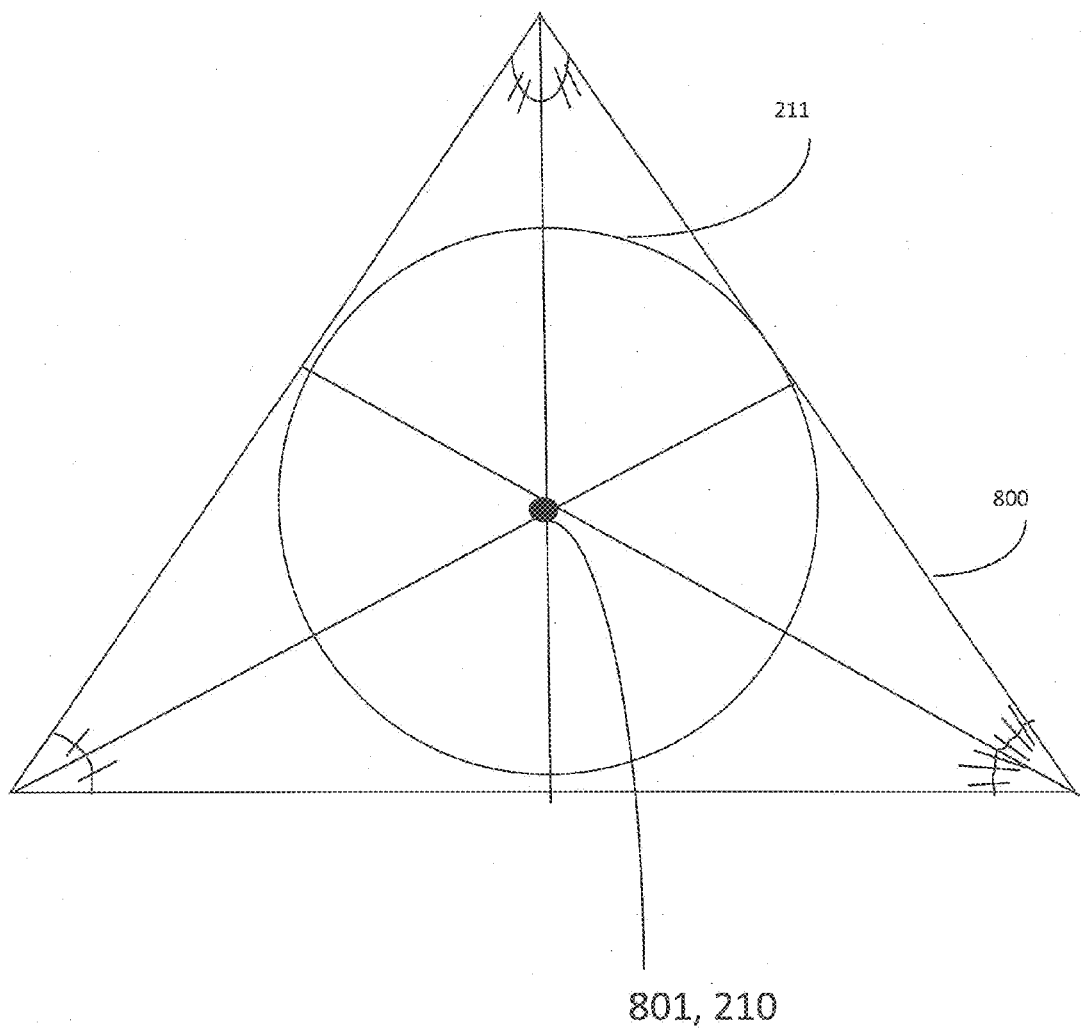
FIG. 44 is a schematic diagram of an imaginary triangle according to an embodiment of the invention.

After the points 205 on the periphery 153 of the representation 151 are selected, embodiments of the invention can further include determining an imaginary circle 211 for each of the points 205 on the representation. Aspects of determining the imaginary circles 211, according to an embodiment of the invention, can be described briefly with reference to FIG. 38, for example. Embodiments of determining or forming an imaginary circle 211 for each of the four points 205 on the representation 151 can include, for example, selecting in step 614 of FIG. 38, three of the four points to form an imaginary triangle 800, as illustrated in FIG. 44. An imaginary triangle 800 is formed, for example, for each mathematical combination of three of the four selected points 205. Embodiments can further include, for example, determining in step 615, the circumcenter 801 of the imaginary triangle 800, and determining in step 616 an imaginary circle 211 for each of the four points 205, where the center of each of the imaginary circles is the circumcenter 801 of the imaginary triangle 800, as illustrated in FIG. 44. According to other embodiments, more or less points 205 on the representations are selected to determine the imaginary circles 211. According to certain embodiments, to determine the imaginary circles 211, the mathematical combinations of a subset of the selected points 205 on the representation are selected such that the peripheries of the imaginary circle 211 interconnects the subset of the selected points.

Figure 13:
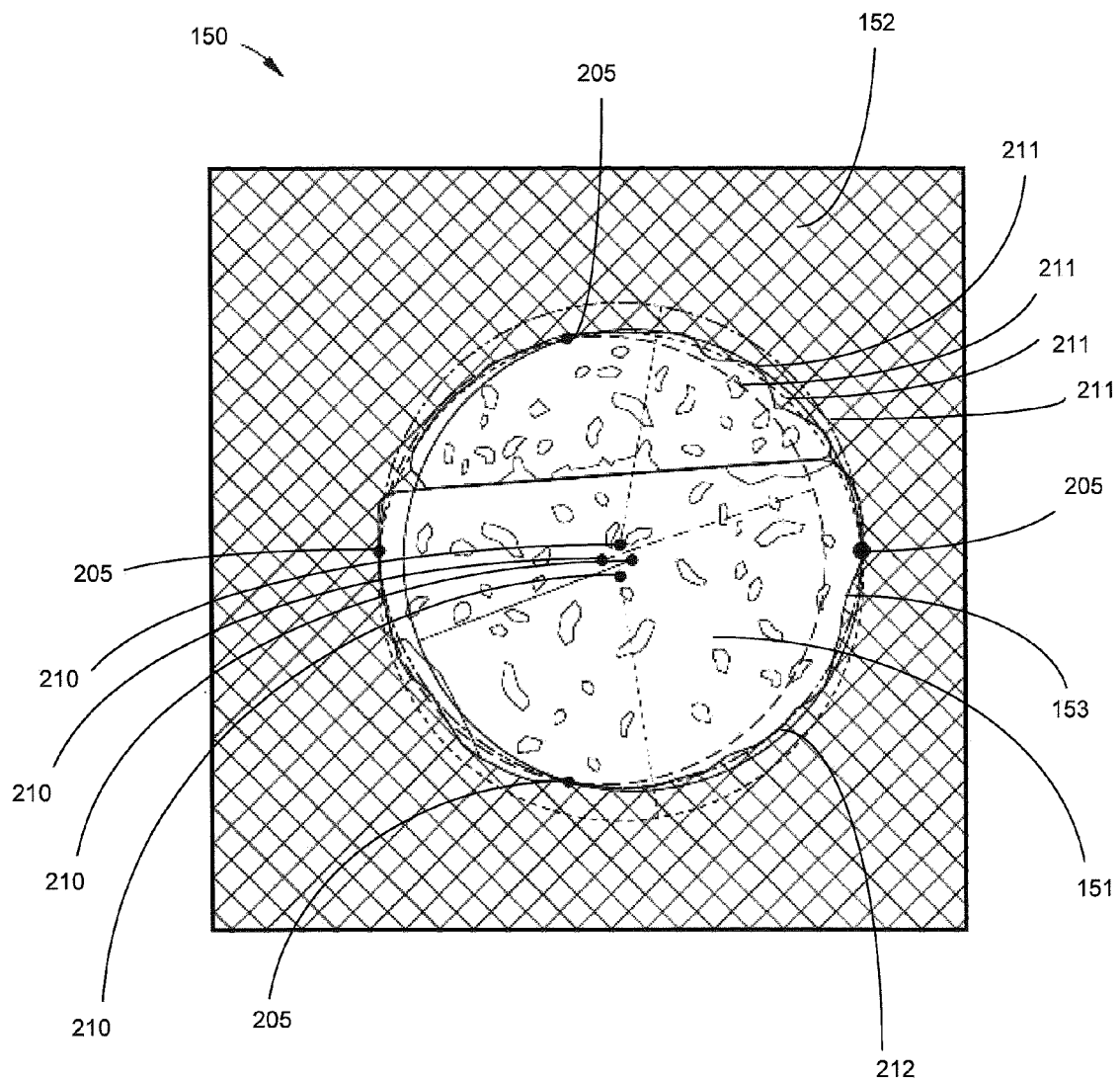
FIG. 13 is a schematic diagram of an image of a transverse section of a core sample according to an embodiment of the invention.
Figure 15:
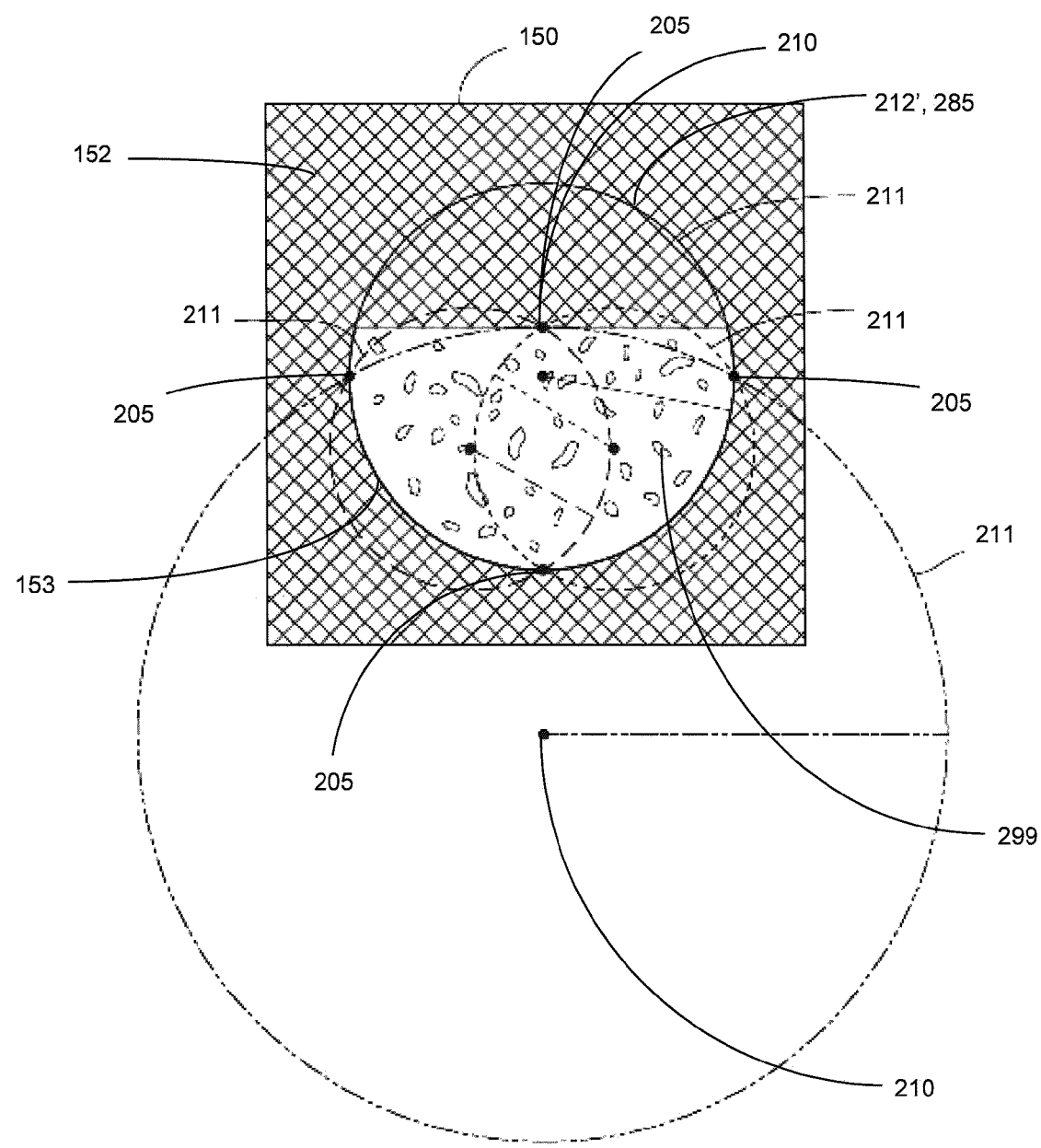
FIG. 15 is a schematic diagram of an image of a transverse section of a core sample according to an embodiment of the invention.
Figure 16:
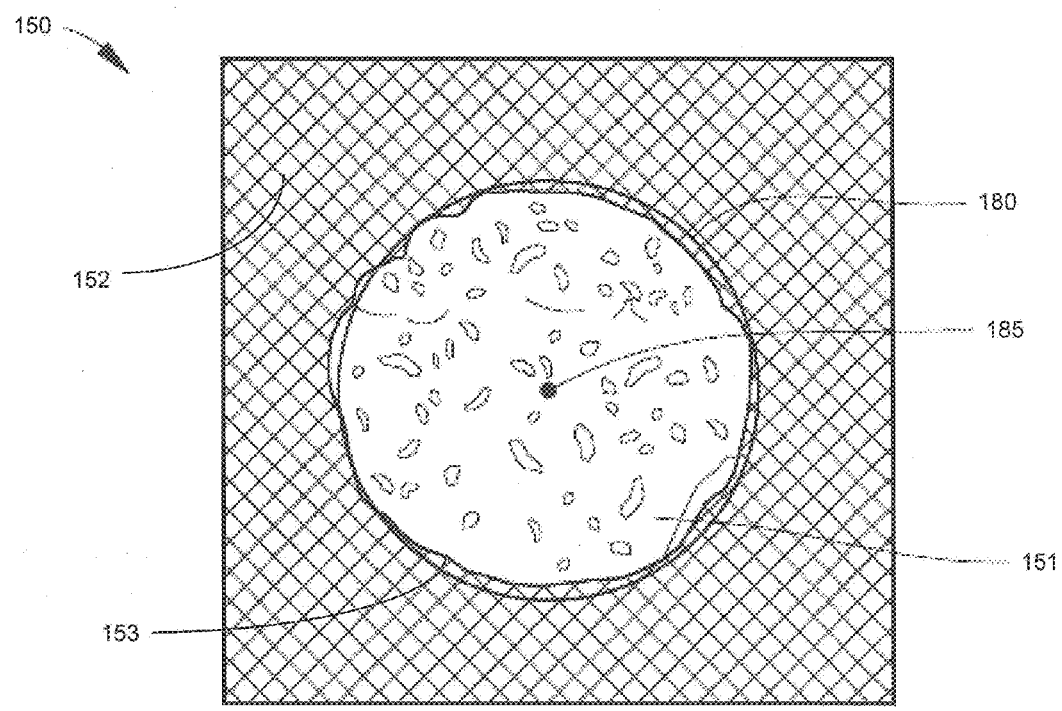
FIG. 16 is a schematic diagram of an image of a transverse section of a core sample according to an embodiment of the invention.
Figure 21:
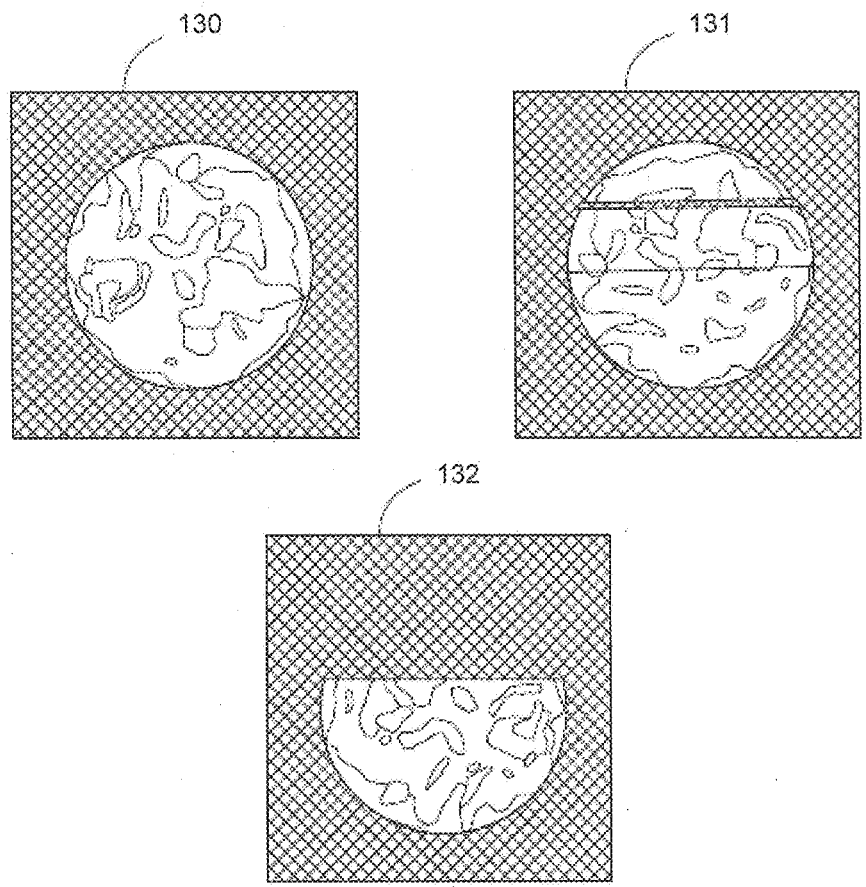
FIG. 21 is a plurality of schematic diagrams of images of transverse sections according to an embodiment of the invention.

FIG. 13 illustrates an imaginary circle 211 for each of the four points 205 on the periphery 153 of the representation 151 according to an embodiment of the invention. In this example embodiment, each circle 211 interconnects three of the four points 205 on the representation. After the imaginary circles 211 are determined, embodiments of the invention can include determining the radius of each circle 211 (see e.g., the lines connected to the center 210 of each imaginary circle 211 in FIG. 13) and selecting the circle 212 with the smallest difference from a predetermined radius of the core sample as the approximate boundary 180. FIGS. 14A-D each illustrates, for example, one of the plurality of imaginary circles 211. In this example embodiment, the circle 212 illustrated in FIG. 14B is the approximated boundary because it has the smallest difference from a predetermined radius of the core sample. FIG. 16 illustrates, for example, the approximated boundary 180 of the representation 151 according to an embodiment of the invention, and the boundary 153 of the representation as depicted from imaging. Embodiments of using imaginary circles 211 to approximate the boundary 180 of a representation 151 can be used for images of a whole core 130, images of a core sample with a slab cut 131, and images of a partial core 132, as illustrated in FIG. 21. FIG. 15, for example, illustrates a plurality of imaginary circles 211 for a partial core sample or a core sample with a slab cut and is discussed further below.

Referring back to FIG. 36, approximating in step 610, the substantially circular boundary 180 is performed for each of the plurality of images of the core sample as part of various embodiments of image registering images to produce aligned transverse sections. Embodiments of image registration can further include, for example, selecting in step 610 a center point 185 of each of the approximated circular boundaries 180 to serve as a reference point 185, as illustrated in FIG. 16, and determining in step 612 an imaginary line that passes through the reference point 185 of the representation 151 of the first end transverse section and extends substantially perpendicularly to the plane of the representation of the first end transverse section to thereby identify a simulated axis 186, as illustrated in FIG. 17. Embodiments can also include aligning in step 613, each, reference point 185 of the images 190 on the simulated axis 186, with each representation 151, as illustrated in FIG. 18, to produce aligned transverse sections.

Figure 10:
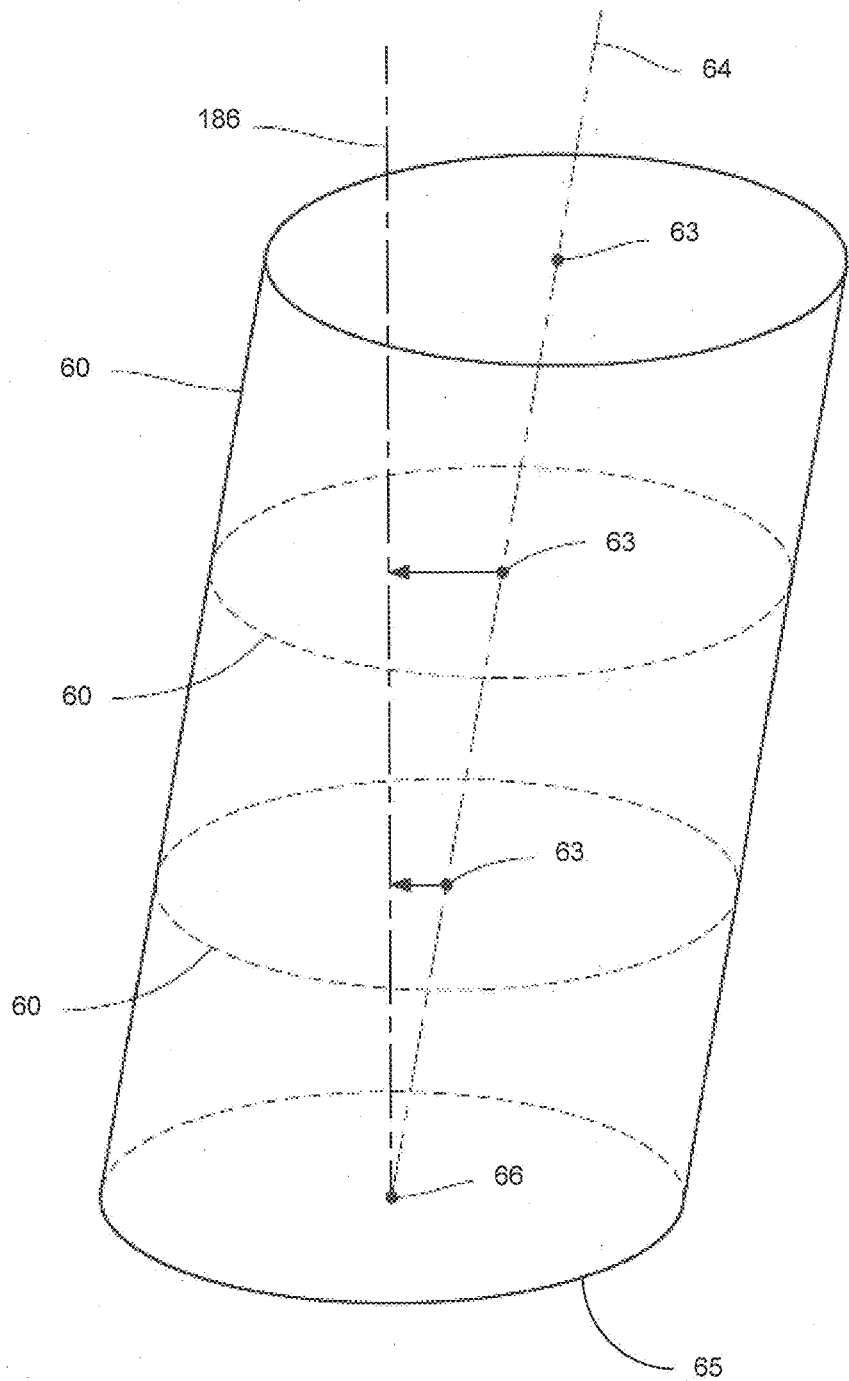
FIG. 10 is a schematic diagram of a model of an askew core sample model according to an embodiment of the invention.
Figure 11:
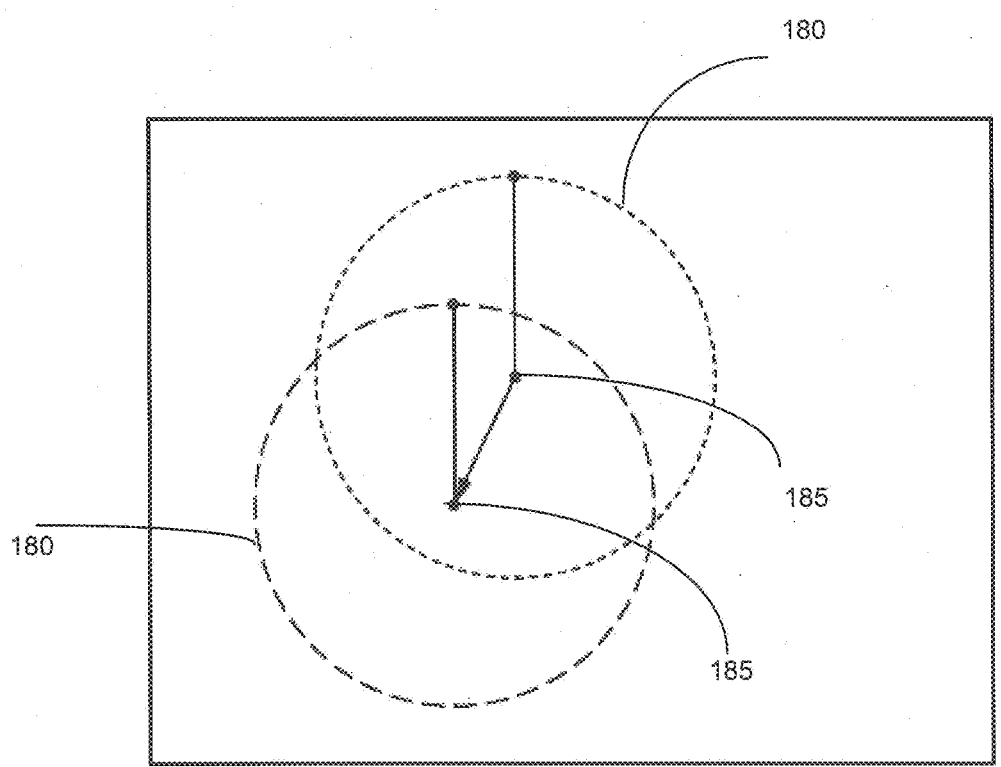
FIG. 11 is a schematic diagram of aligned images of a transverse section of a core sample according to an embodiment of the invention.

According to an embodiment, the aligned images 190 are sequential ordered from the first end 102 to the second end 103, or vice versa. Each representation of a transverse section 110 in each of the images is translated so as to position each center point 185 on the simulated axis 186, as illustrated in FIG. 11. FIG. 10, for examples, illustrates the an uncorrected axis 64 that passes through the center points 63 of representations of uncorrected images 60, and a simulated axis 186 according an embodiment of the invention.

Figure 19:
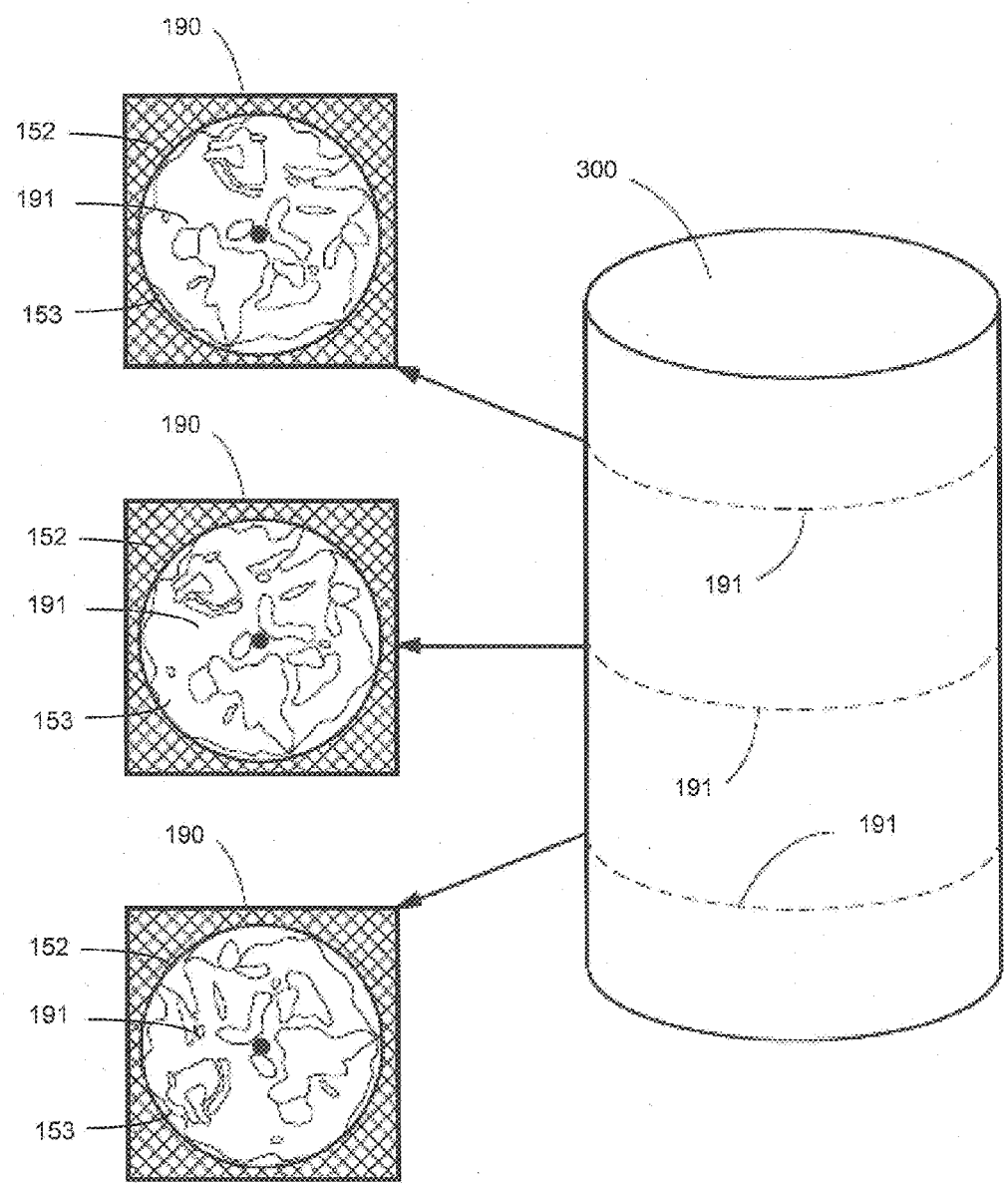
FIG. 19 is a schematic diagram of a core sample model according to an embodiment of the invention.
Figure 20:
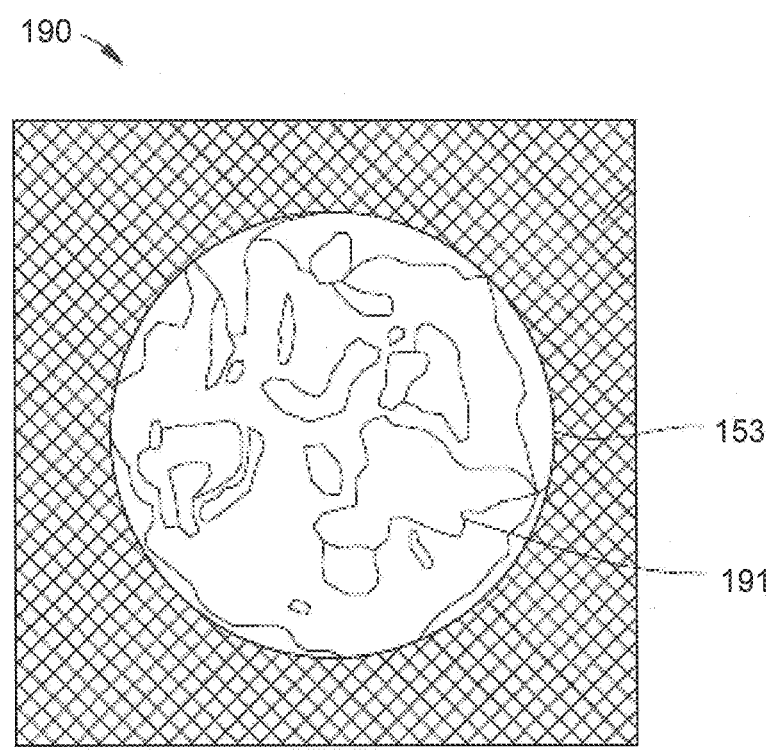
FIG. 20 is a schematic diagram of an image of a transverse section of a core sample according to an embodiment of the invention.
Figure 39:
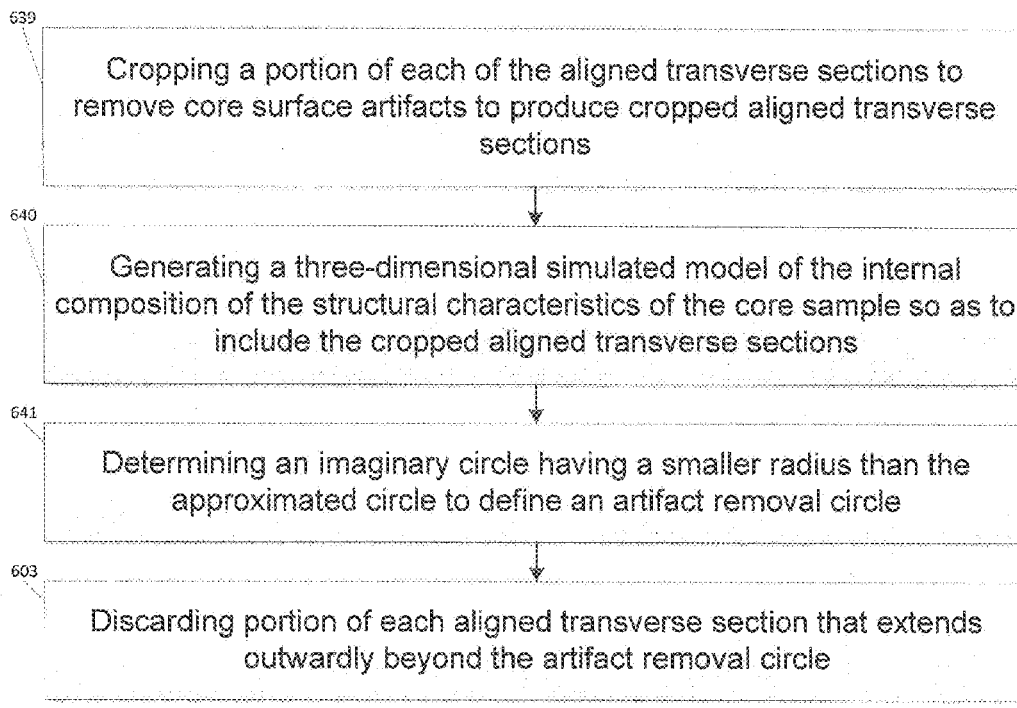
FIG. 39 is a schematic method flow diagram of a method to process images of two-dimensional transverse sections of a core sample according to an embodiment of the invention.

After the images are aligned, embodiments of the invention can further include cropping in step 639 of FIG. 39, a portion of each of the plurality of aligned transverse sections 191 for core surface artifact removal to produce cropped aligned transverse sections 191. FIG. 20 illustrates a cropped aligned image 190, and FIG. 19 illustrates a plurality of cropped aligned transverse sections 191 according to an embodiment of the invention. Embodiments of the invention can also include an artifact removal process that includes the steps of, for example, determining in step 640, an imaginary circle 211 having a smaller radius than the approximated circle 180 to thereby identify an artifact removal circle, and discarding in step 641, portions of each aligned transverse section that extends outwardly beyond the artifact removal circle. After artifact removal, embodiments of the invention can further include generating in step 605, a three-dimensional simulated model 300 of the core sample of the internal composition of the structural characteristics of the core sample.

Figure 22:
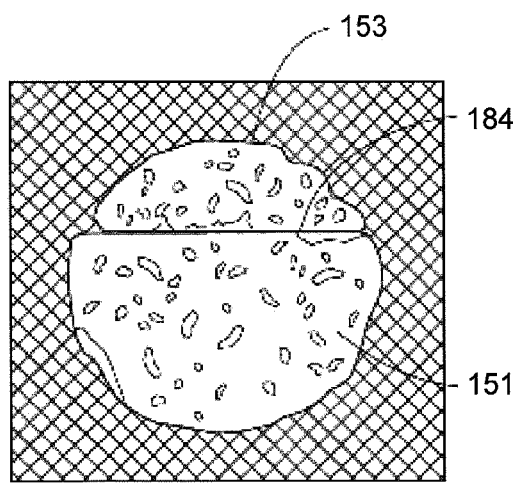
FIG. 22 is a schematic diagram of an image of a transverse section of a core sample according to an embodiment of the invention.
Figure 25:
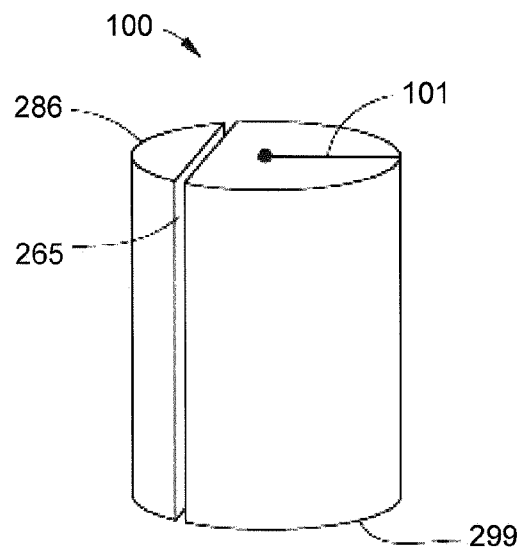
FIG. 25 is a schematic diagram of a core sample according to an embodiment of the invention.

Embodiments of the present invention also include computer-implemented methods, systems, and one or more non-transitory memories having one or more computer programs for saw cut correction. As understood by those skilled in the art, a portion of the core sample is sometimes removed (e.g., a slab cut) with a cutting tool to facilitate removing the core sample from the borehole. As illustrated in FIG. 25, this causes the core sample to have two pieces that are often put together during imaging as illustrated in FIG. 22 for example. This is sometimes an undesirable processing artifact. Accordingly, embodiments of the invention include, for example, computer-implemented methods, systems, and one or more non-transitory memories storing one or more computer programs to adjust the images of the core sample to more accurately reflect the shape of the core sample before the saw cut line was made. In some embodiments of the invention, the saw cut correction 52 can be performed after image registration 51 of the images, as indicated in FIG. 2, for example. In other embodiments, the saw cut correction 52 is performed without image registration.

Figure 40:
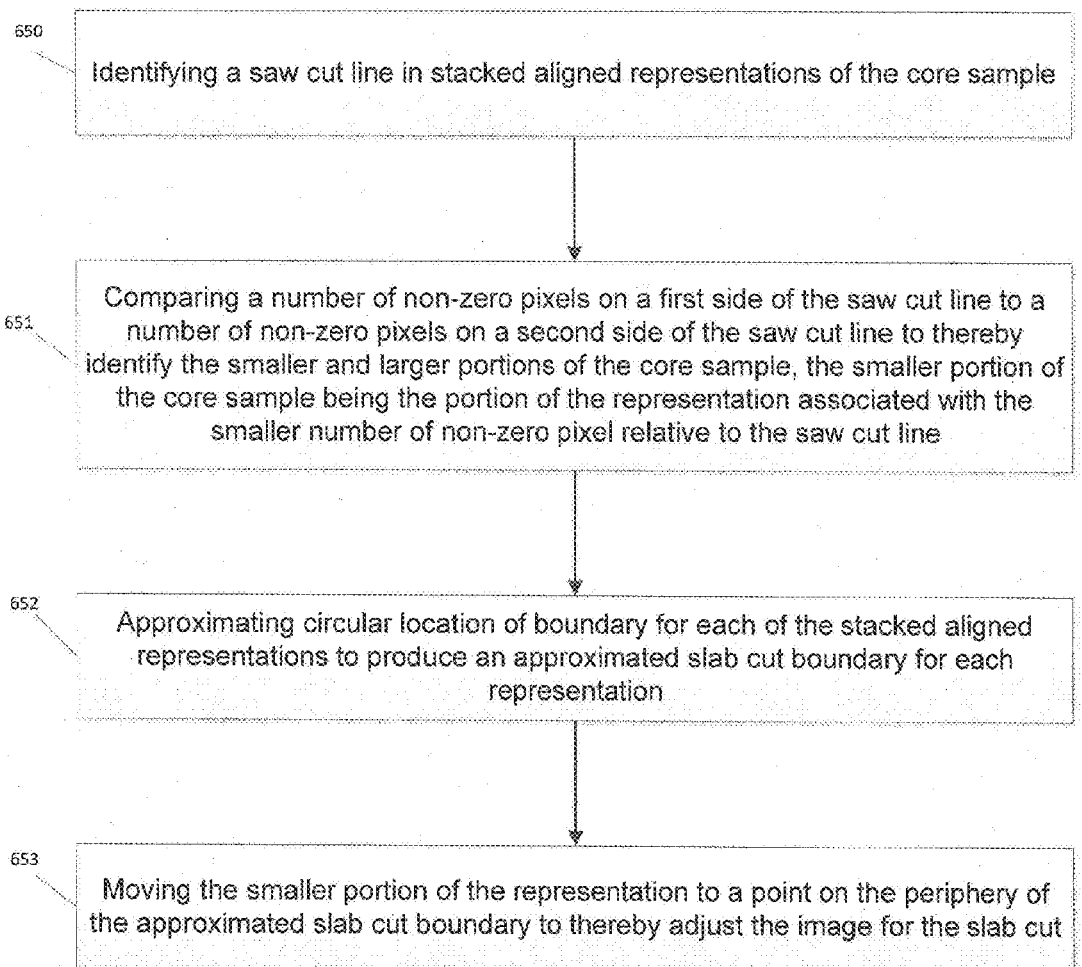
FIG. 40 is a schematic method flow diagram of a method to perform a saw cut correction according to an embodiment of the invention.

General aspects of the saw correction process, according an embodiment of the invention, can be described briefly with reference to FIG. 40. Saw cut correction embodiments can include, for example, the steps of identifying in step 650, a saw cut line of aligned representations, comparing in step 651, a number of non-zero pixels on a first side of the saw cut line to a number of non-zero pixels on a second side of the saw cut line to thereby identify the smaller and larger portions of the core sample. The smaller portion of the core sample being, for example, the portion of the representation associated with the smaller number of non-zero pixels relative to the saw cut line, and the larger portion of the core sample being, for example the portion of the representation associated with the larger number of non-zero pixels relative to the saw cut line. Embodiments of the saw cut correction process can also include, for example, approximating in step 652, the slab cut boundary of the aligned representations, and moving in step 653, the smaller portion of the representation to a point on the periphery of the approximated circular boundary to thereby adjust the image for the slab cut. More particular aspects of the saw cut correction process, according to various embodiments, can be explained with reference to FIG. 41 for example.

Figure 41:
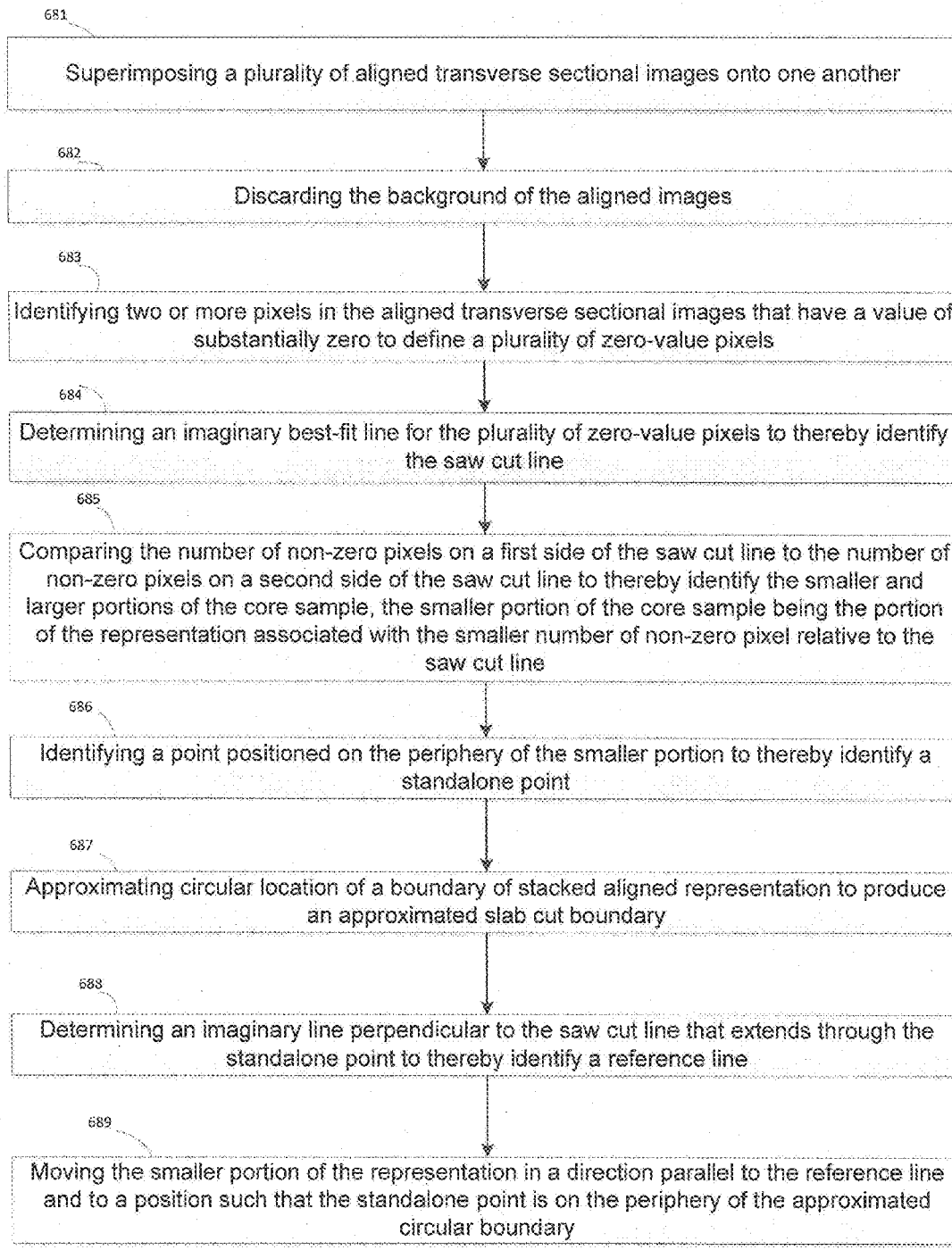
FIG. 41 is a schematic method flow diagram of a method to perform a saw cut correction according to an embodiment of the invention.

To facility identifying the saw cut line, embodiments of the present invention can include superimposing at step 681 in FIG. 41, a plurality of aligned transverse sectional images onto one another. Vugs, which are small cavities in the subsurface material, and the saw cut line 284 in the images have similar characteristics (e.g., pixel values at or near zero). Stacking the plurality of transverse sectional images 190 enhances the characteristics of the saw cut line 284 and attenuates the signature of vugs. Unlike the saw cut line, vugs, for example, are unlikely to be at the same or close to the same x and y locations image after image.

Figure 28:
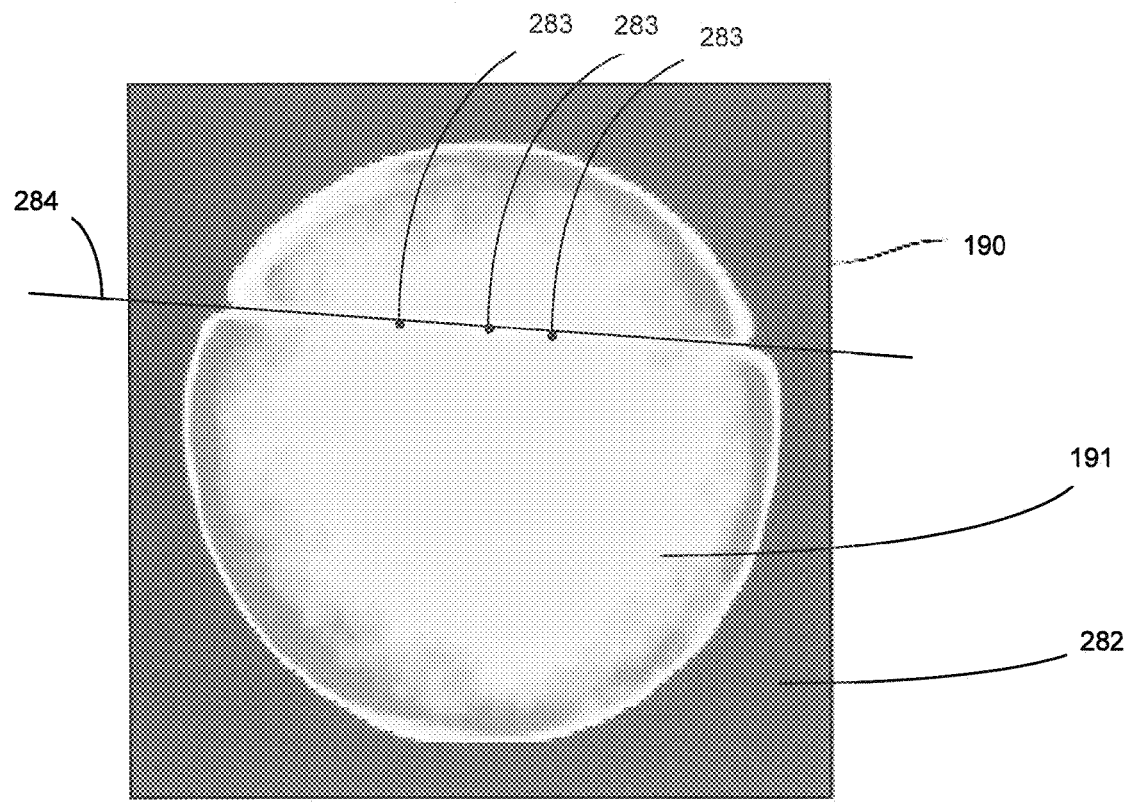
FIG. 28 is a schematic diagram of an image of transverse sections of a core sample according to an embodiment of the invention.
Figure 30:
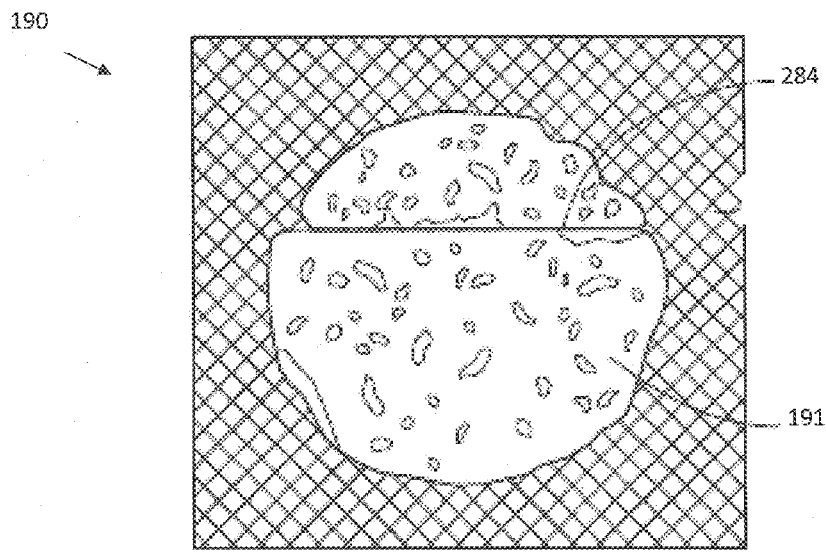
FIG. 30 is a schematic diagram of an image of transverse sections of a core sample according to an embodiment of the invention.
Figure 31:
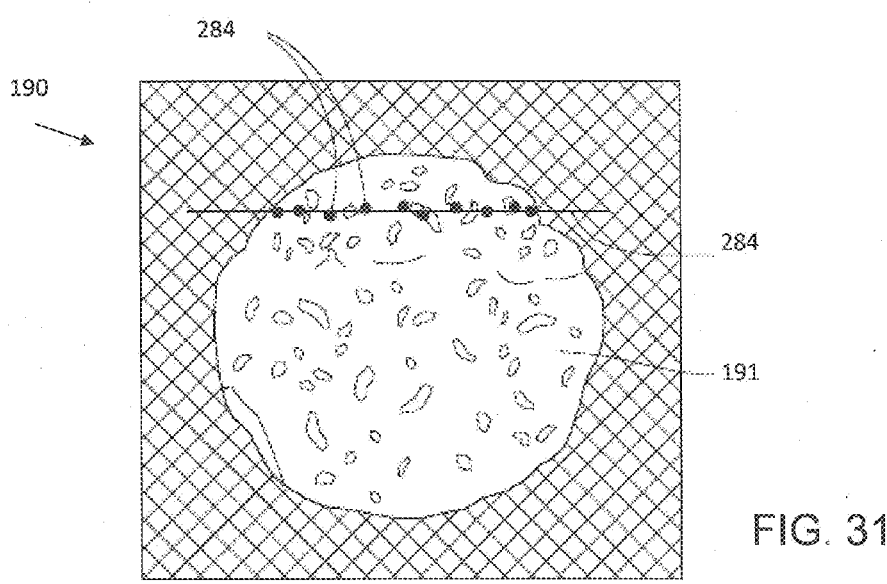
FIG. 31 is a schematic diagram of an image and saw cut line of a transverse section of a core sample according to an embodiment of the invention.

FIG. 28 illustrates, for example, one of the plurality of stacked aligned transverse sectional images 190 according to an embodiment of the invention. After the images 190 are stacked, the background 152 of the stacked aligned images can be discarded at step 681 of FIG. 41 to further enhance the characteristics of the saw cut line 284 such as illustrated in FIG. 30, for example. After the images 190 are stacked and the background is discarded or cropped, embodiments of the invention can further include identifying at step 682 of FIG. 41, two or more pixels in the one or more stacked representations 190 that have a value of substantially zero and determining at step 683 an imaginary best-fit line 284 for the identified zero-value pixels 283 to thereby identify the saw cut line 284. FIG. 31, for example, illustrates the saw cut line 284 according to an embodiment of the invention.

Figure 29:
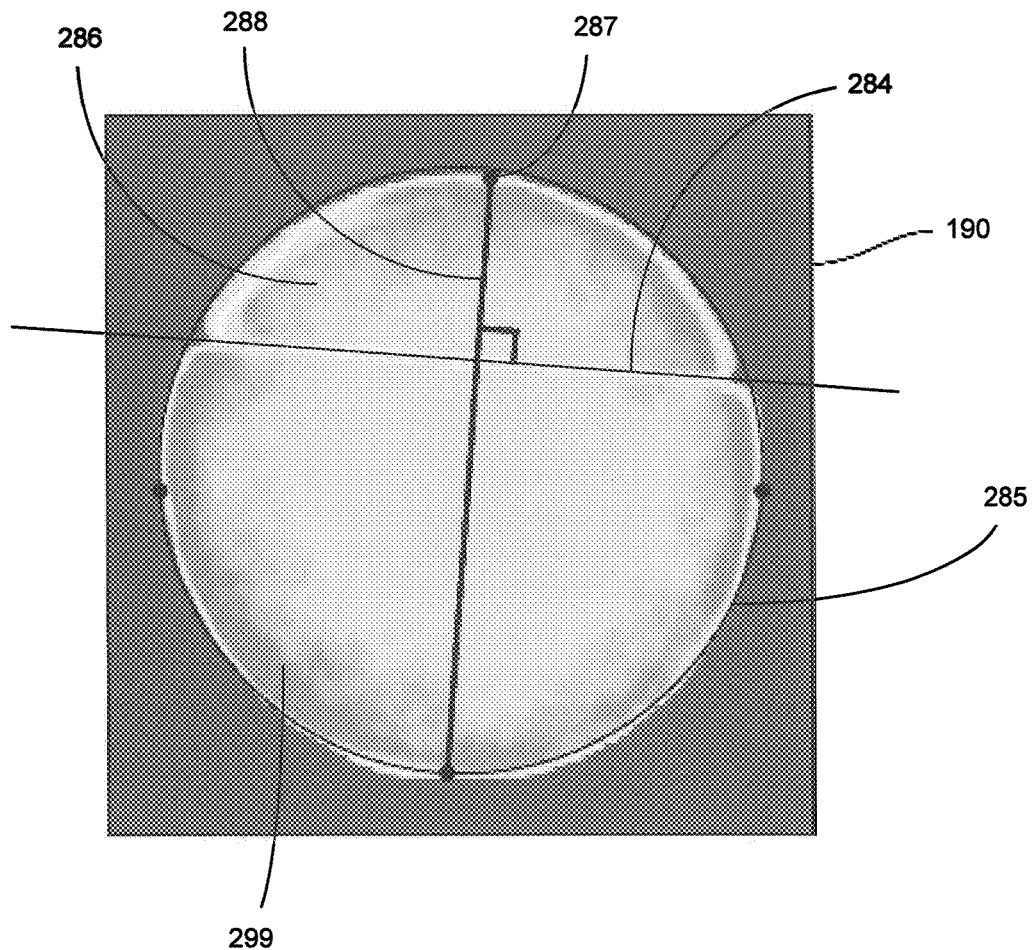
FIG. 29 is a schematic diagram of an image of transverse sections of a core sample according to an embodiment of the invention.

As discussed above, when the core sample is removed from the borehole, a saw cut line 284 is sometimes made and the core sample is often cut into two portion portions, in addition to identifying the saw cut line 284, embodiments of the invention can also include, for example, identifying the smaller and larger portions of the core sample relative to the saw cut line 284. To do this, embodiments include, for example, compating at step 685 in FIG. 41, the number of non-zero pixels on a first side of the saw cut line 284 to the number of non-zero pixels on a second side of the saw cut line 284. Dark pixels such as dark blue or black have values that are at or near zero. Accordingly, identifying the non-zero pixels (or a pixels equal to or greater than a predetermined number) according to embodiments of the invention will identify the pixels associated with the representation of the core sample. The section of the representation with the smallest number of pixels is the smaller portion 286 of the core sample, as illustrated in FIG. 29 for example, and the section with the largest number of pixels is the larger portion 299 of the core sample.

Figure 32:
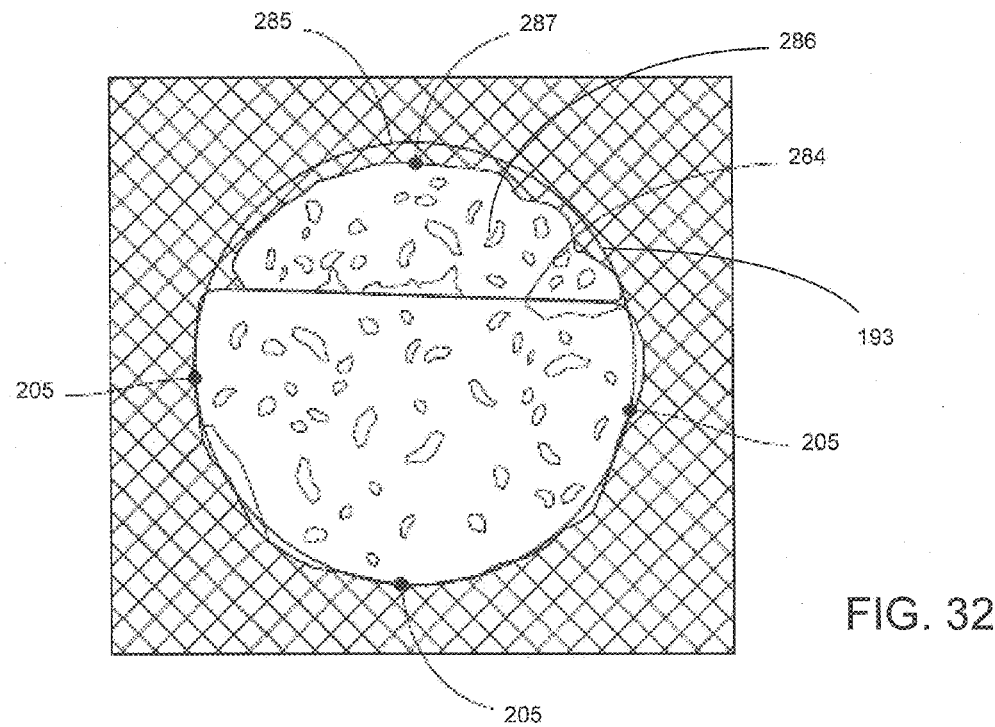
FIG. 32 is a schematic diagram of an image of a transverse section of a core sample according to an embodiment of the invention.

Embodiments of the present invention can further include identifying in step 686, a point positioned on the periphery of the smaller portion of the representation to thereby identify a standalone point 287. The standalone point 287 can be used to adjust the image for the width of the piece of the core sample that was removed from the core sample. This is the estimated saw cut width as will be appreciated by those skilled in the art. According to some embodiments, the standalone point 287 can be identified by locating the first non-zero pixel on the smaller portion 286 that is perpendicular to the perpendicular bisector 220 of the periphery of the image. In FIG. 32, for example, the top side of the image is closest to the smaller portion 286 of the representation. In this example embodiment, the standalone point 287 can be determined by locating the one or more first non-zero pixels when moving from an initial position of the top side of the image towards the center of the representation (e.g., moving in a direction parallel to the saw cut line 284). As will be understood by those skilled in the art, with the discarded background, the area between the periphery of the image and the boundary of the representation will be substantially devoid of color pixels, and the representation of the core sample will include color pixels. Accordingly, identifying one or more first non-zero pixels on the smaller portion 286 of the representation will identify one or more pixels on an upper end of the representation of the core sample.

Embodiments of the saw cut correction can also include approximating in step 687 of FIG. 41, the substantially circular location of the boundary of the stacked representation 190 with a slab cut to thereby identify the approximate slab cut boundary 285. More specific aspects of approximating the slab cut boundary, according to an embodiment of the invention, are illustrated in the flow chart in FIG. 42 for example. To approximate the slab cut boundary 285, embodiments of the invention include computer-implemented methods, systems, and computer programs implemented by one or more computer processors to automatically determine in step 660 of FIG. 42, the perpendicular bisectors 220 on each side of the image 190, and selecting in step 661, four or more points 205 on the larger portion of the representation 299 that intersect with the perpendicular bisectors 220. FIG. 15, for example, illustrates four points 205 on the larger portion 299 that are perpendicular to the points 220 on the periphery of the image 190.

The perpendicular bisectors 220 of the image, for example, can be determined by calculating the number of pixels per direction and dividing this number by half for each side of the image. Points 205 on the representation 151 are automatically determined, according to various embodiments, by locating, for example, one or more first non-zero pixels when moving from an initial position of a side of the image towards the center of the larger portion 299 of the representation. Pixels of the representation 151 are in color according to an embodiment of the invention. Accordingly, identifying one or more first non-zero pixels (e.g., color pixels) on the larger portion 299 of the representation will identify one or more points 205 on the boundary 153 of the larger portion 299 of the representation 151 of the core sample according to an embodiment of the invention. In some embodiments, four or more points 205 on the larger portion 299 of the representation 151 are selected. In other embodiments, less than four points 205 on the representation 151 are selected. According to an exemplary embodiment, the selected points 205 on the representation 151 are perpendicular to the perpendicular bisectors 220 of the image 150 as illustrated in FIG. 25 for example. According to certain embodiments, the selected points 205 on the larger portion 299 of the representation are not perpendicular to the perpendicular bisector 220 of the image 150 but are identified as being one or more first non-zero pixel and therefore on the boundary 153 of the representation 151.

Figure 42:
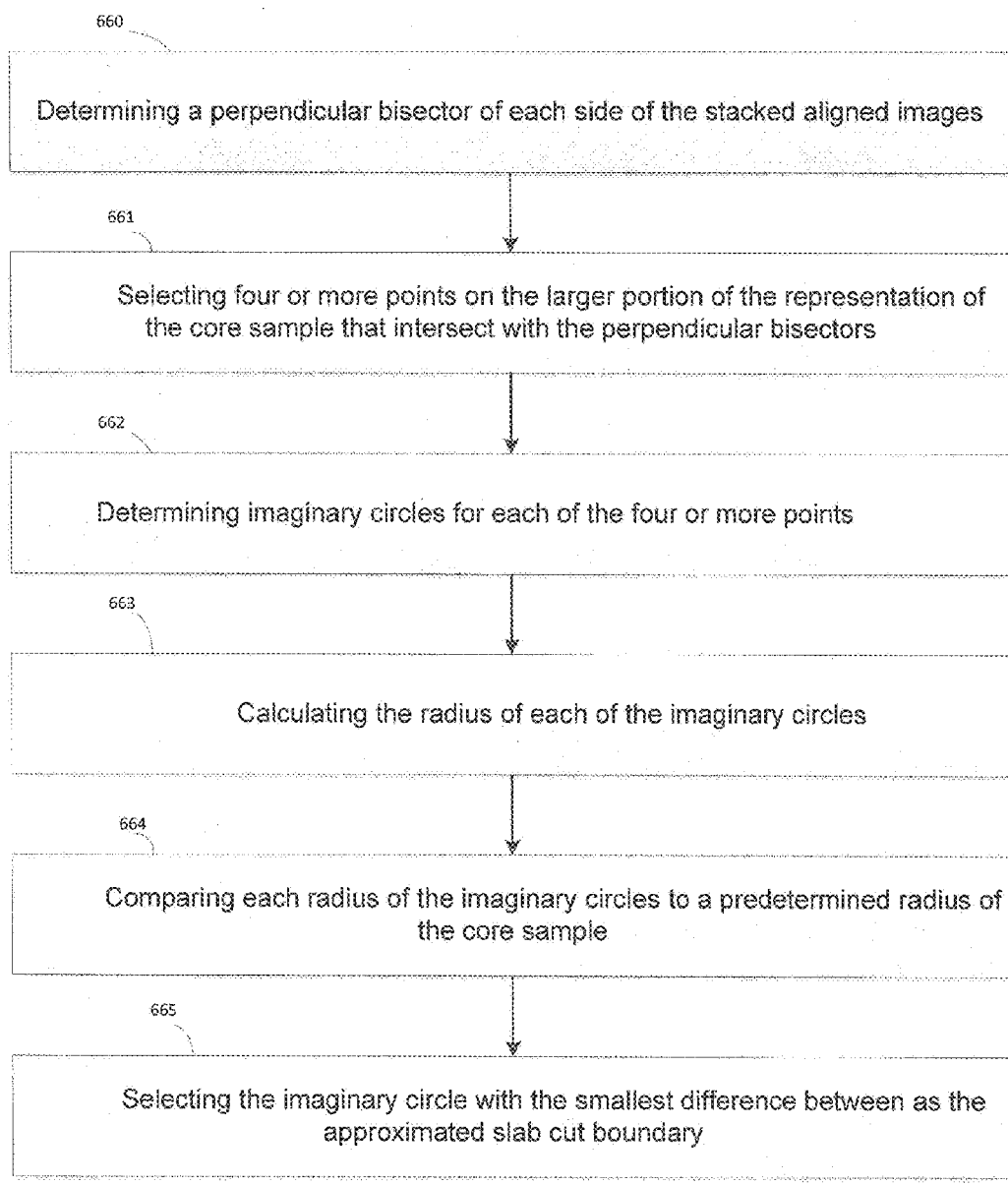
FIG. 42 is a schematic method flow diagram of a method to approximate circular location of a slab cut boundary for an image according to an embodiment of the invention.
Figure 43:
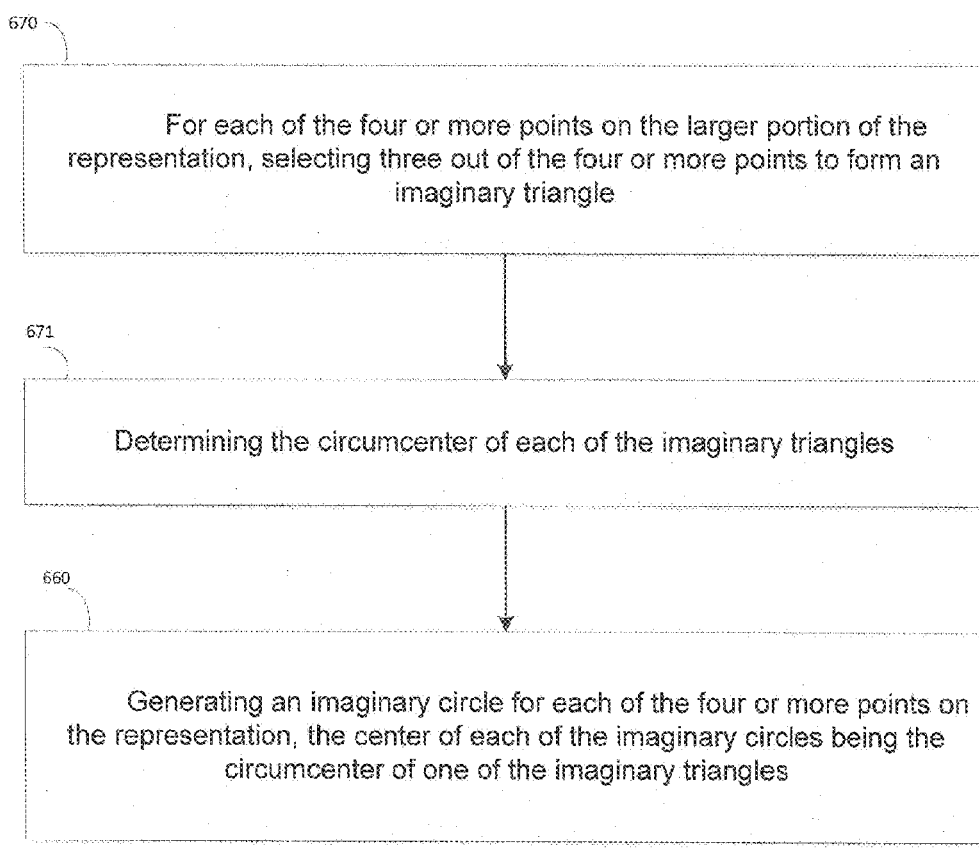
FIG. 43 is a schematic method flow diagram of a method to determine imaginary circles according to an embodiment of the invention.

After the points 205 on the larger portion 299 of the representation are selected, embodiments of the invention can further include determining in step 662 of FIG. 42, imaginary circles 211 for each of the our or more points 205 on the larger portion 299 of the representation. Aspects of determining the imaginary circles 211 for the slab cut boundary, according to an embodiment of the invention, can further be described with reference to FIGS. 43 and 44. Determining or forming an imaginary circle 211 for each of the four points 205 on the larger portion 299 of the representation can include, for example, selecting in step 670 of FIG. 43, three of the four points to form an imaginary triangle 800, as illustrated in FIG. 44. An imaginary triangle 800 is formed for each mathematical combination of three of the four selected points 205. Embodiments can further include, for example, determining in step 671, the circumcenter 801 or the imaginary triangle 800, and determining in step 660 an imaginary circle 211 for each of the four points 205, where the center of each of the imaginary circles is the circumcenter 801 of the imaginary triangle 800, as illustrated in FIG. 44. According to other embodiments, more or less points 205 on the representations are selected to determine the imaginary circles 211. According to certain embodiments, to determine the imaginary circles 211, the mathematical combinations of a subset of the selected points 205 on the representation are selected such that the peripheries of the imaginary circle 211 interconnects the subset of the selected points.

FIG. 15, for example, illustrates four imaginary circles 211, one for each of the four points 205 on the larger portion 299 of the representation. In this example embodiment, each circle 211 interconnects three of the four points 205 on the larger portion 299 of the representation. After the imaginary circles 211 are determined for each of the points 205 on the boundary 153 of the larger portion 299 of the representation, embodiments of the invention can further include calculating in step 662 of FIG. 42, the radii of the imaginary circles 211 (see e.g., the lines connected to the center 210 of each imaginary circle 211 in FIG. 25) and calculating in step 663, the difference between each imaginary circle radius and a predetermined radius of the core sample. Embodiments can further include, for example, selecting in step 664, the circle 212 with the smallest difference between its radius and the radius of the core sample as the approximated slab cut boundary 285 of the representations. In the example embodiment illustrated in FIG. 25, the circle 212 is the approximated slab cut boundary 285. In certain embodiments, the slab cut boundary 285 is approximated using points only on the smaller portion 286 of the representation, and in other embodiments, the boundary is approximated using points on both the smaller 286 and larger 299 portions of the representation. FIG. 32, for example, illustrates the approximated slab cut boundary 285 and the standalone point 287 according to an embodiment of the invention.

Figure 23:
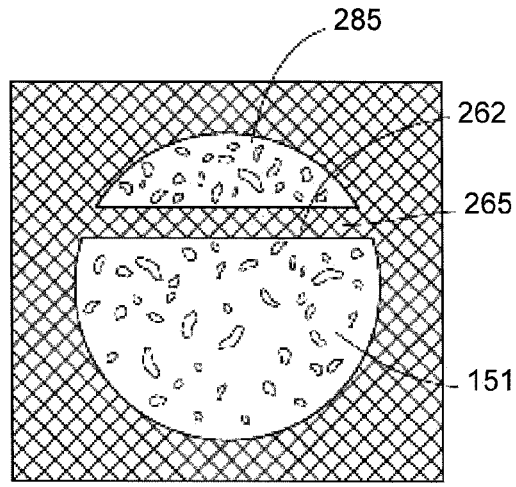
FIG. 23 is a schematic diagram of an approximated slab cut boundary of a transverse section of a core sample according to an embodiment of the invention.
Figure 24:
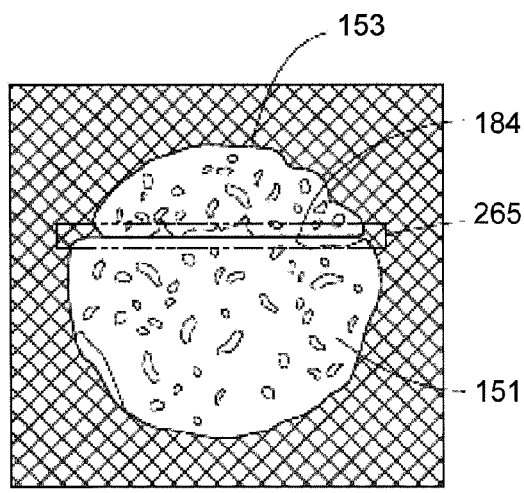
FIG. 24 is a schematic diagram of an image of a transverse section of a core sample according to an embodiment of the invention.
Figure 33:
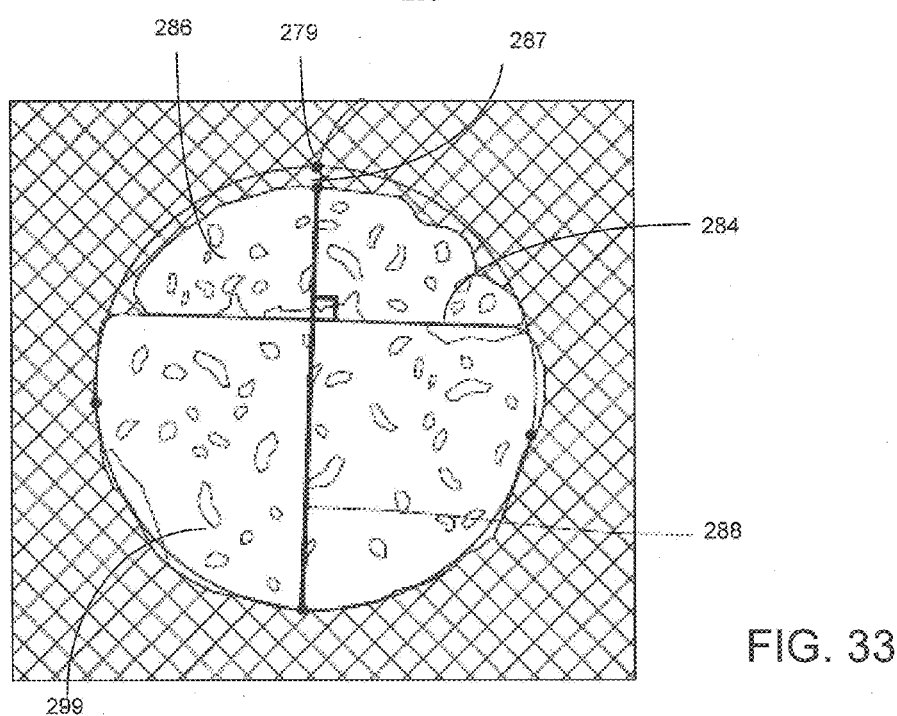
FIG. 33 is a schematic diagram of an image of a transverse section of a core sample according to an embodiment of the invention.

The distance 287 between the standalone point 287 on the smaller portion 286 and the approximated slab cut boundary 285, as illustrated in FIGS. 32 and 33, is the distance 287 the smaller portion 286 of the representation is moved to account for the portion of the core sample that was removed from the core sample according to an embodiment of the invention. To move the smaller portion 287, embodiments of the invention include, for example, determining in step 687 of FIG. 41, an imaginary line 288 that is perpendicular to the saw cut line 284 and that extends through the standalone point 287 to thereby identify a reference line 288, as illustrated in FIGS. 29 and 33. The smaller portion 286 is then moved in step 689, parallel to the reference line 288 such that the standalone point 287 is on the peripheries of the approximated slab cut boundary 285. The adjusted images more accurately reflect the original shape of the core sample because they have been adjusted to reflect the approximate portion of the core sample that was removed when the sample was cut from the borehole. FIG. 22, for example, illustrates an image of a representation of the core sample before the image is adjusted to account for the slab cut. FIG. 23, for example, illustrates the image after being adjusted to account for the slab cut according to an embodiment of the invention. FIG. 24 illustrate the estimated width of the slab cut 265 according to an embodiment of the invention.

As indicated in FIG. 2, after saw-cut correction 52, a series of images can undergo artifact removal 53. Artifact removal 53 can include eliminating part of a representation 151 of a transverse section 110 in an image 150 to minimize the effects of any noise in the image 150. Noise can result from a variety of sources, including the process of coring and the process of acquiring images of transverse sections of a core sample 100. Artifact removal 53 can include cropping a portion of the representation 151 of a transverse section 110 such that the representation 151 becomes substantially circular in shape, as illustrated in FIGS. 19 and 20, for example.

After artifact removal 53, the series of images can undergo a beam hardening correction 54. Beam hardening can occur during CT scan (CTS) imaging and causes measured CT values to be higher for measurements taken towards the edge of a core sample 100. Beam hardening results from unequal absorption at different energies in a polychromatic x-ray beam: the energy distribution changes as the x-rays 32 permeate the core sample 100 such that the material of the core sample 100 filters photons with lower energies. Consequently, measurements can include lower attenuations from the center of a core sample 100 and higher attenuations from the edges of the core sample 100. CTS images can therefore benefit from a correction for this effect. A polynomial regression can include a distance from the imaginary axis 104 of the core sample 100 as an independent variable and computerized tomography value measurements as the dependent variable. After beam hardening correction 54, the series of images can be used to model the core sample 100 that was imaged and ultimately to model a borehole based on the core sample 100 using multi-point statistics techniques with a core sample model 300 as a training image.

Figure 26:
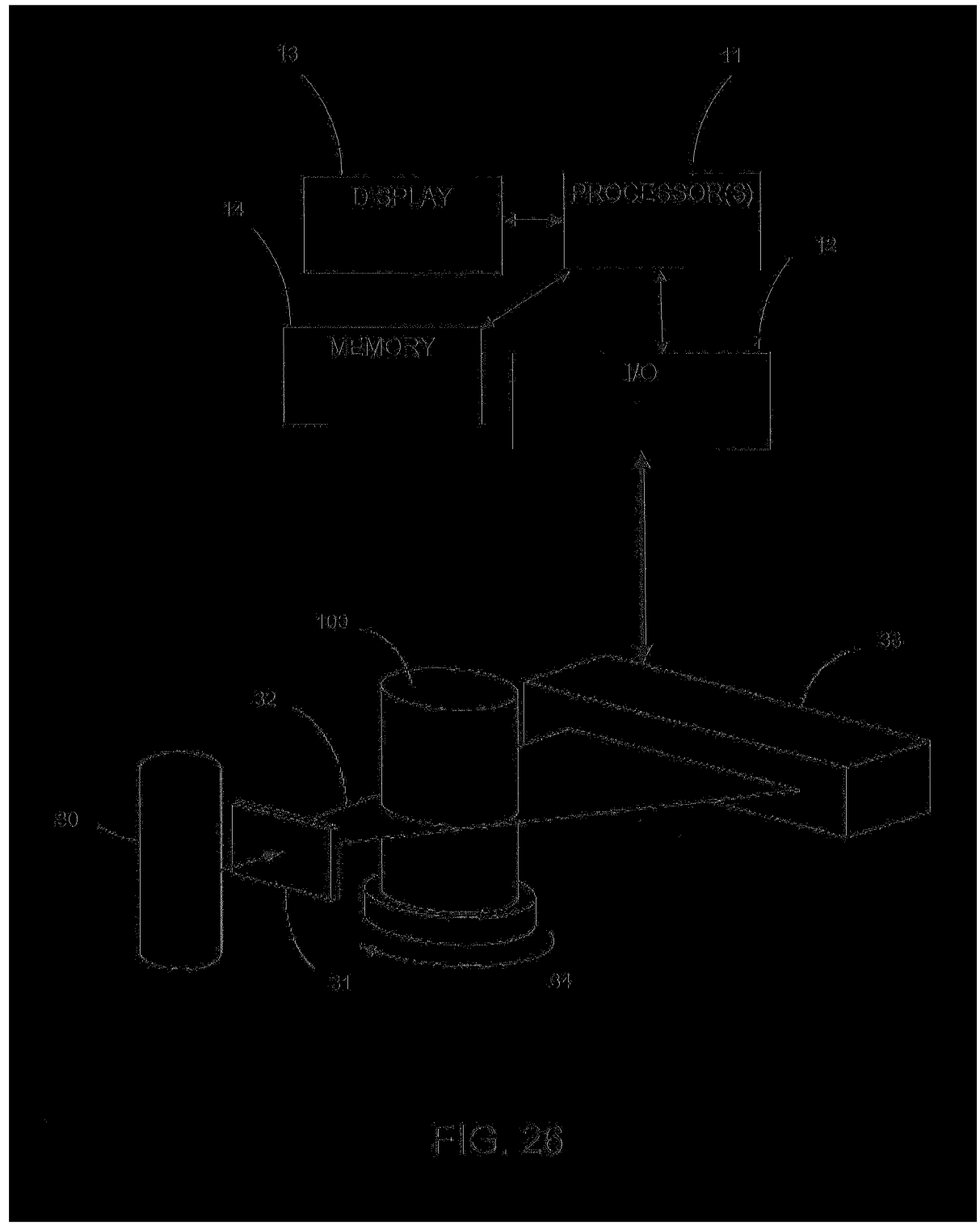
FIG. 26 is a schematic diagram of a system to manipulate images of two-dimensional transverse sections of a core sample according to an embodiment of the invention.
Figure 34:
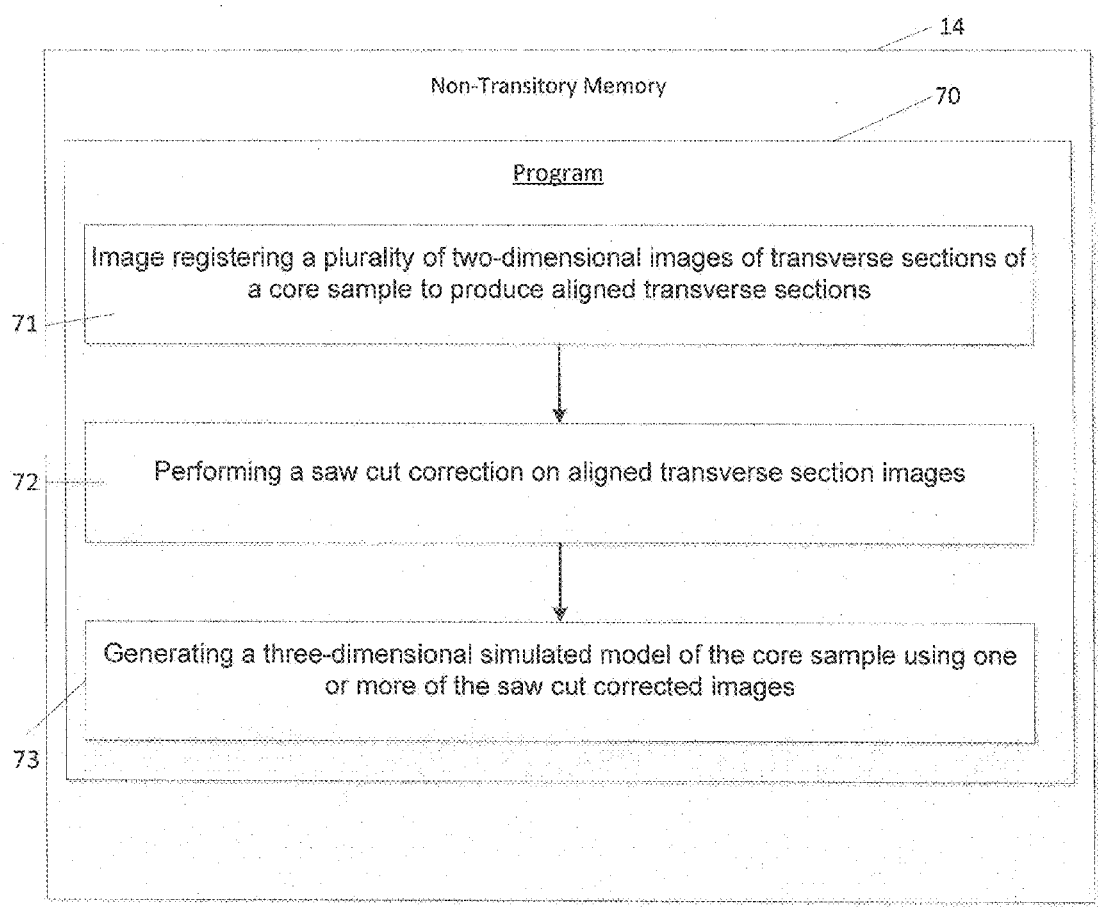
FIG. 34 is a schematic diagram of a computer program to process images of two-dimensional transverse sections of a core sample according to an embodiment of the invention.

As discussed above, embodiments of the invention also include systems to process two-dimensional images of two-dimensional transverse sections 110 of a real, substantially cylindrical core sample 100 of subsurface material so as to be able to simulate a three-dimensional model 300 of the core sample 100. A system, for example, as shown in FIG. 26, can include one or more computers having one or more processors 11, an input and output unit 12 in communication with the one or more processors 11, one or more displays 13 in communication with the one or more processors 11, and non-transitory memory 14 in communication with the one or more processors 11. The non-transitory memory 14 can include computer-readable instructions such as a computer program 70 that when executed causes the system to perform a series of steps to manipulate images of two-dimensional transverse sections 110 of a core sample 100 so as to simulate a model 300 of the core sample 100. As illustrated in FIG. 34, for example, the computer program 70 can include the instructions such as, image registering in step 71, a plurality of two-dimensional images of transverse sections of a core sample to produce aligned transverse sections. Computer program embodiments can further includes the instructions such as, performing in step 72, a saw cut correction on aligned transverse section images, and generating in step 73, a three-dimensional simulated model of the core sample using one or more of the saw cut corrected images. The computer programs can include, for examples, one or more computer modules adapted to perform instructions according to embodiments of the invention. The computers can be further adapted to communicate over a communication network. According to an embodiment of the invention, the system includes one or more first computers adapted to work in conjunction with the image capturing devices and connected to a communication network to communicate the captured images to one or more second computers adapted to process the images to develop, for example, models of the core sample.

As will be understood with reference to the paragraphs above and the referenced drawings, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in non-transitory storage mediums other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such computer-readable storage media with regard to embodiments of computer-implemented methods described. Likewise, any reference to the following computer-implemented methods with respect to systems and computer-readable storage media is provided for explanatory purposes, and is not intended to limit any of such computer-implemented methods described.

As used throughout this application, the words "may" or "can" are used in a permissive sense (i.e., meaning having the potential to), rather than the mandatory sense (i.e., meaning must). The words "include", "including", and "includes" mean including, but not limited to. As used throughout this application, the singular forms of articles, such as "a", "an" and "the," include plural referents unless the content clearly indicates otherwise. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic, optical, or magnetic quantities within memories, registers, or other information storage devices, transmission devices, or display devices of the special purpose computer or similar special purpose electronic processing/computing device.

In the drawings and specification, there have been disclosed embodiments of the embodiments of methods, systems, and non-transitory computer-readable medium having computer program stored therein of the present invention, and although specific terms are employed, the terms are used in a descriptive sense only and not for purposes of limitation. The embodiments of methods, systems, and non-transitory computer-readable medium having computer program stored therein of the present invention have been described in considerable detail with specific reference to these illustrated embodiments. It will be apparent, however, that various modifications and changes can be made within the spirit and scope of the embodiments of methods, systems, and non-transitory computer-readable medium having computer program stored therein of the present invention as described in the foregoing specification, and such modifications and changes are to be considered equivalents and part of this disclosure.

That claimed is:

1. A computer-implemented method to process two-dimensional images of a core sample, the method comprising:

approximating, using one or more computer processors, a circular boundary for each of a plurality of polygon shaped images of a substantially cylindrical core sample, each image having a representation of a different transverse section of the core sample and a background that substantially surrounds the representation;

selecting, using one or more computer processors, a center point of each of the approximated circular boundaries of the images to define a reference point;

determining, using one or more computer processors, an imaginary line passing through the reference point of a first end of the representation of one of the plurality of transverse sections and extending substantially perpendicular to the plane of the representation of the first end to thereby define a simulated axis; and aligning, using one or more computer processors, each of the representations of transverse sections along the simulated axis, each reference point being positioned on the simulated axis.

2. A computer-implemented method as defined in claim 1, wherein approximating the circular boundary comprises the steps of:

determining a perpendicular bisector of each side of the images;

selecting four or more points on the representation that intersects with the perpendicular bisectors;

for each of the four or more points, selecting at least three out of the four or more points to form an imaginary triangle;

determining a circumcenter of each of the imaginary triangles;

determine a radius of a plurality of imaginary circles, the center of each of the imaginary circles being one of circumcenters of the imaginary triangles;

comparing each radius of the plurality of imaginary circles to a predetermined radius of the core sample; and selecting the circle having the smallest difference between its radius and the predetermined radius of the core sample to define the approximated circular boundary.

3. A computer-implemented method as defined in claim 1, wherein the approximating the circular boundary comprises the steps of:

determining four or more points on the representation;

determining an imaginary circle for each of the four or more points, each imaginary circle interconnecting a subset of at least three of the four or more points on the representation; and selecting the imaginary circle having the smallest difference between its radius and a predetermined radius of the core sample to define the approximated circular boundary.

4. A computer-implemented method as defined in claim 1, wherein the method further comprises:

generating a three-dimensional simulated model of the internal composition of the structural characteristics of the core sample on a display using the aligned representation of the transverse sections of the core sample.

5. A computer-implemented method as defined in claim 4, wherein the method further comprises:

generating a three-dimensional simulated model of the internal composition of the structural characteristics of a borehole on the display using the aligned representation of the transverse sections of the core sample.

6. A computer-implemented method of claim 1, wherein the method further comprises, before approximating the circular boundary, capturing a plurality of two-dimensional images of a plurality of transverse sections of the core sample using a core sample imaging device.

7. A computer-implemented method of claim 1, wherein the method farther comprises:

cropping a portion of each of the plurality of aligned transverse sections to remove core surface artifact to thereby form simulated peripheries to be substantially similar in size and to define a plurality of cropped aligned transverse sections, the cropped aligned transverse sections to include the aligned representations of the transverse sections and to exclude cropped portions; and generating a three-dimensional simulated model of the internal composition of the structural characteristics of the core sample on a display using the aligned representation, of the transverse sections of the core sample.

8. A system to process two-dimensional images of the internal composition of the structural characteristics of a real, three-dimensional, substantially cylindrical core sample of subsurface material to simulate a three-dimensional model, the system comprising:

one or more processors;

an input and output unit in communication with the one or more processors;

one or more displays in communication with the one or more processors; and one or more non-transitory memories in communication with the one or more processors, the one or more memories having one or more computer programs with computer-readable instructions stored therein that when executed cause the system to perform the steps of:

approximating, using the one or more computer processors, a circular boundary for each of a plurality of polygon shaped images of a substantially cylindrical core sample, each image having a representation of a different transverse section of the core sample and a background that substantially surrounds the representation, the approximating being responsive to receiving the plurality of images through the input and output unit;

selecting, using one or more computer processors, a center point of each of the approximated circular boundaries of the images to define a reference point;

determining, using the one or more computer processors, an imaginary line passing through the reference point of a first end of the representation of one of the plurality of transverse sections and extending substantially perpendicular to the plan of the representation of the first end to thereby define a simulated axis; and aligning, using the one or more computer processors, each of the representations of transverse sections along the simulated axis, each reference point being positioned on the simulated axis.

9. A system as defined in claim 8, wherein the computer computer-readable instructions further cause the system to approximate the circular boundary by perform the steps of:

determining a perpendicular bisector of each side of the images;

selecting four or more points on the representation that intersects with the perpendicular bisectors;

for each of the four or more points, selecting at least three out of the four or more points to form an imaginary triangle;

determining a circumcenter of each of the imaginary triangles;

determine a radius of a plurality of imaginary circles, the center of each of the imaginary circles being one of circumcenters of the imaginary triangles;

comparing each radius of the plurality of imaginary circles to a predetermined radius of the core sample; and selecting the circle having the smallest difference between its radius and the predetermined radius of the core sample to define the approximated circular boundary.

10. A system as defined in claim 8, the system further comprising:

an image capturing device adapted to capture a plurality of images of the core sample; and wherein the input output unit is adapted to receive the plurality of images from the image capturing device.

11. A system as defined in claim 8, wherein the computer computer-readable instructions further cause the system to approximate the circular boundary by perform the steps of:

determining four or more points on the representation;

determining an imaginary circle for each of the four or more points, each imaginary circle interconnecting a subset of at least three of the four or more points on the representation; and selecting the imaginary circle having the smallest difference between its radius and a predetermined radius of the core sample to define the approximated circular boundary.

12. A system as defined in claim 8, wherein the computer computer-readable instructions further cause the system to perform the steps of:

generating a three-dimensional simulated model of the internal composition of the structural characteristics of the core sample on a display using the aligned representation of the transverse sections of the core sample.

13. A system as defined in claim 12, wherein the computer computer-readable instructions further cause the system to perform the steps of:

generating a three-dimensional simulated model of the internal composition of the structural characteristics of a borehole on the display using the aligned representation of the transverse sections of the core sample.

14. A system as defined in claim 8, wherein the computer computer-readable instructions further cause the system to perform the steps of:

cropping a portion of each of the plurality of aligned transverse sections to remove core surface artifact to thereby form simulated peripheries to be substantially similar in size and to define a plurality of cropped aligned transverse sections, the cropped aligned transverse sections to include the aligned representations of the transverse sections and to exclude cropped portions; and generating a three-dimensional simulated model of the internal composition of the structural characteristics of the core sample on a display using the aligned representation of the transverse sections of the core sample.

15. A system as defined in claim 8, wherein the computer computer-readable instructions further cause the system to perform the step of, before approximating the circular boundary, capturing a plurality of two-dimensional images of a plurality of transverse sections of the core sample using a core sample imaging device.

16. Non-transitory memory having one or more computer programs stored therein, the computer programs having computer-readable instructions that when executed cause one or more computer processors to perform the steps of:

approximating, using the one or more computer processors, a circular boundary for each of a plurality of polygon shaped images of a substantially cylindrical core sample, each image having a representation of a different transverse section of the core sample and a background that substantially surrounds the representation, the approximating being responsive to receiving the plurality of images through the input and output unit;

selecting, using one or more computer processors, a center point of each of the approximated circular boundaries of the images to define a reference point;

determining, using the one or more computer processors, an imaginary line passing through the reference point of a first end of the representation of one of the plurality of transverse sections and extending substantially perpendicular to the plan of the representation of the first end to thereby define a simulated axis; and aligning, using the one or more computer processors, each of the representations of transverse sections along the simulated axis; each reference point being positioned on the simulated axis.

17. Non-transitory memory as defined in claim 16, wherein the computer computer-readable instructions further cause the one or more computer processors to approximate the circular boundary by perform the steps of:

determining a perpendicular bisector of each side of the images;

selecting four or more points on the representation that intersects with the perpendicular bisectors;

for each of the four or more points, selecting at least three out of the four or more points to form an imaginary triangle;

determining a circumcenter of each of the imaginary triangles;

determine a radius of a plurality of imaginary circles, the center of each of the imaginary circles being one of circumcenters of the imaginary triangles;

comparing each radius of the plurality of imaginary circles to a predetermined radius of the core sample; and selecting the circle having the smallest difference between its radius and the predetermined radius of the core sample to define the approximated circular boundary.

18. Non-transitory memory as defined in claim 16, wherein the computer-readable instructions further cause the one or more computer processors to perform the steps of:

generating a three-dimensional simulated model of the internal composition of the structural characteristics of the core sample on a display using the aligned representation of the transverse sections of the core sample.

19. Non-transitory memory as defined in claim 16, wherein the computer-readable instructions further cause the one or more computer processors to perform the steps of:

cropping a portion of each of the plurality of aligned transverse sections to remove core surface artifact to thereby form simulated peripheries to be substantially similar in size and to define a plurality of cropped aligned transverse sections, the cropped aligned transverse sections to include the aligned representations of the transverse sections and to exclude cropped portions; and generating a three-dimensional simulated model of the internal composition of the structural characteristics of the core sample on a display using the aligned representation of the transverse sections of the core sample.

20. Non-transitory memory as defined in claim 16, wherein the computer-readable instructions further cause the one or more computer processors to perform the steps of:

generating a three-dimensional simulated model of the internal composition of the structural characteristics of a borehole on a display using the aligned representation of the transverse sections of the core sample.

* * * * *